(12) United States Patent
Wada et al.

(10) Patent No.: US 9,371,229 B2
(45) Date of Patent: Jun. 21, 2016

(54) OZONE-GENERATING SYSTEM AND OZONE GENERATION METHOD

(71) Applicants: Noboru Wada, Tokyo (JP); Norimitsu Esaki, Tokyo (JP); Hajime Nakatani, Tokyo (JP); Yasutaka Inanaga, Tokyo (JP); Yoshiaki Odai, Tokyo (JP)

(72) Inventors: Noboru Wada, Tokyo (JP); Norimitsu Esaki, Tokyo (JP); Hajime Nakatani, Tokyo (JP); Yasutaka Inanaga, Tokyo (JP); Yoshiaki Odai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/376,261

(22) PCT Filed: Feb. 12, 2013

(86) PCT No.: PCT/JP2013/053220
§ 371 (c)(1),
(2) Date: Aug. 1, 2014

(87) PCT Pub. No.: WO2013/150819
PCT Pub. Date: Oct. 10, 2013

(65) Prior Publication Data
US 2015/0021162 A1 Jan. 22, 2015

(30) Foreign Application Priority Data
Apr. 5, 2012 (JP) .................. 2012-086015

(51) Int. Cl.
*C01B 13/11* (2006.01)
*B01J 19/08* (2006.01)

(52) U.S. Cl.
CPC .............. *C01B 13/11* (2013.01); *B01J 19/088* (2013.01); *B01J 2219/00051* (2013.01);
(Continued)

(58) Field of Classification Search
CPC C01B 13/11; C01B 2201/14; C01B 2201/22; C01B 2201/32; C01B 2201/76; C01B 2201/64; C01B 2201/10; C01B 2201/90; B01J 19/088; B01J 2219/51; B01J 2219/164; B01J 2219/809

See application file for complete search history.

(56) References Cited

U.S. PATENT DOCUMENTS

| 5,632,868 | A | 5/1997 | Harada et al. |
| 5,759,497 | A | 6/1998 | Kuzumoto et al. |

(Continued)

FOREIGN PATENT DOCUMENTS

| CN | 102049056 A | 5/2011 |
| EP | 0 703 187 A2 | 3/1996 |

(Continued)

OTHER PUBLICATIONS

International Search Report Issued Mar. 19, 2013 in PCT/JP13/053220 filed Feb. 12, 2013.

(Continued)

*Primary Examiner* — Kishor Mayekar
(74) *Attorney, Agent, or Firm* — Oblon, McClelland, Maier & Neustadt, L.L.P.

(57) ABSTRACT

A system including: an ozone generating device including discharge electrodes forming a discharge space; a gas supplying device; a power source device that supplies power to the discharge electrodes; a temperature adjustment device that adjusts temperature of the discharge electrodes; a control unit that controls the ozone generating device; and a detection unit that detects an ozone generation parameter in the ozone generating device. The control unit increases temperature of the discharge electrodes up to a vaporizing temperature of dinitrogen pentoxide by controlling the temperature adjustment device and the gas supplying device or the temperature adjustment device and the power source device, based on the output ozone generation parameter, to thereby switch operation from a normal operation mode to a cleaning operation mode in which surfaces of the discharge electrodes and the discharge space are cleaned up while continuing generation of ozone in the discharge space.

21 Claims, 12 Drawing Sheets

(52) U.S. Cl.
CPC ............... *B01J 2219/00164* (2013.01); *B01J 2219/0809* (2013.01); *C01B 2201/10* (2013.01); *C01B 2201/14* (2013.01); *C01B 2201/22* (2013.01); *C01B 2201/32* (2013.01); *C01B 2201/64* (2013.01); *C01B 2201/76* (2013.01); *C01B 2201/90* (2013.01)

(56) References Cited

U.S. PATENT DOCUMENTS

| | | |
|---|---|---|
| 5,792,326 A | 8/1998 | Harada et al. |
| 5,948,374 A | 9/1999 | Kuzumoto et al. |
| 6,093,289 A | 7/2000 | Kuzumoto et al. |
| 2003/0007908 A1* | 1/2003 | Han .................. C01B 3/382 422/186.07 |
| 2003/0147787 A1* | 8/2003 | Borgstrom .............. C01B 13/11 422/186.07 |

FOREIGN PATENT DOCUMENTS

| | | |
|---|---|---|
| JP | 2001 180916 | 7/2001 |
| JP | 2002 265204 | 9/2002 |
| JP | 2004 002185 | 1/2004 |

OTHER PUBLICATIONS

Combined Office Action and Search Report issued Jul. 29, 2015 in Chinese Patent Application No. 201380011846.9 (with English language translation and English translation of categories of cited documents).

* cited by examiner

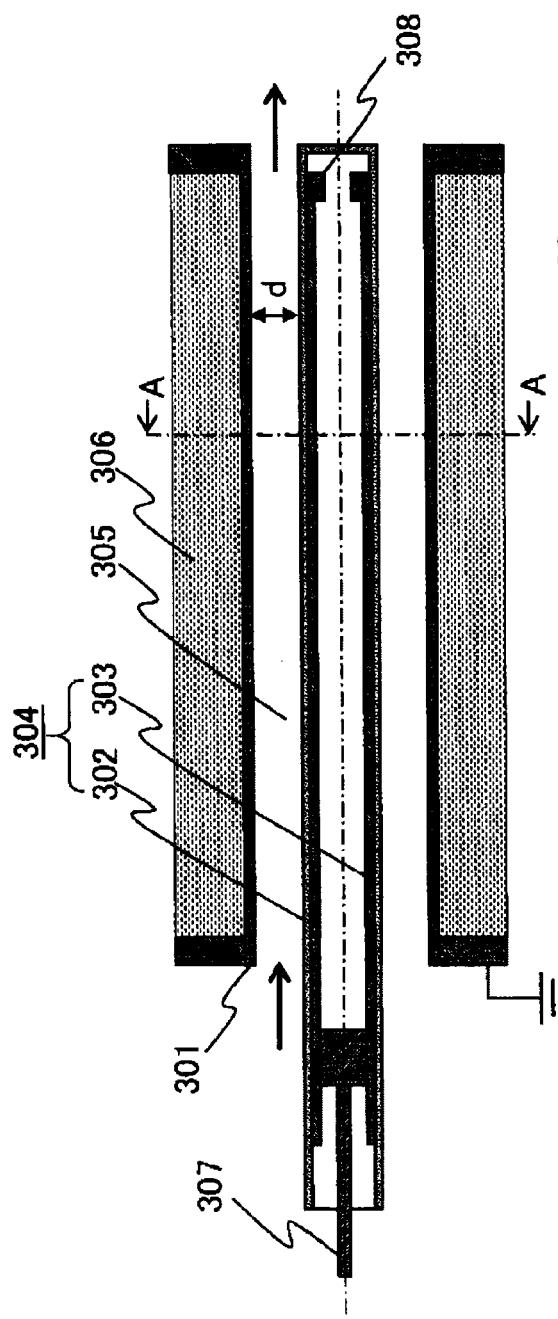
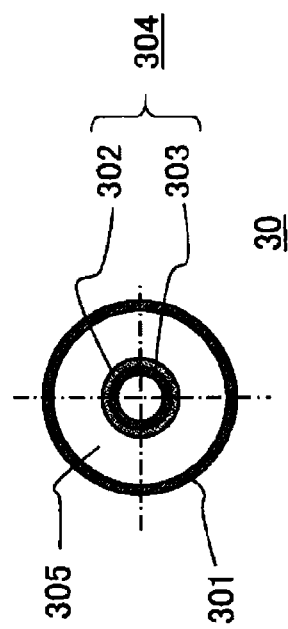
Fig. 2A
Fig. 2B

OZONE-GENERATING SYSTEM AND OZONE GENERATION METHOD

TECHNICAL FIELD

The present invention relates to an ozone generating system and an ozone generation method for generating ozone using an electric discharge.

BACKGROUND ART

In ozone generating systems that use as a source material, air or a nitrogen-added oxygen gas, to thereby generate ozone ($O_3$) using an electric discharge, it is generally known that a nitrogen oxide ($NO_x$) is produced as a byproduct in association with the generation of ozone. Further, because of being under ozone coexistence condition, the byproduct nitrogen oxide mostly exists in a form of dinitrogen pentoxide ($N_2O_5$). $N_2O_5$ has a physical property that is solidified at an ambient temperature under 30° C., so that there is a possibility that, under a normal operating condition, it adheres to almost all areas inside an ozone generating device as a discharge product.

Meanwhile, with respect to typical ozone generating systems, a periodic inspection per 3 to 5 years is recommended by the makers thereof. At that inspection, the system is suspended and further the ozone generating device is made open to atmosphere, so that a maintenance work to take out and clean up its electrode is performed. When the ozone generating device in a state with solid $N_2O_5$ adhering thereto, is made open to atmosphere, there arises concern that its metal member is corroded by nitric acid ($HNO_3$) produced from a reaction of $N_2O_5$ with water in the atmosphere. This causes adherent materials to accumulate in the ozone generating device, which results in reduction of the ozone generation efficiency or results in choke-off in a pipe that provides an ozone generation space, so that it is difficult to maintain a stable operating state.

Thus, there are proposed: a method of handling an ozone generating device in which the tank of the ozone generating device, after it is kept heated using a water-heating device, is made open to atmosphere, to thereby remove $N_2O_5$ adhered inside the ozone generating device through vaporization (see, for example, Patent Document 1); and an ozone generator which includes means for purging inside the ozone generation device using an inert gas or a cleaning liquid (see, for example, Patent Document 2).

CITATION LIST

Patent Document

Patent Document 1: Japanese Patent Application Laid-open No. 2002-265204 (Paragraphs 0025 to 0035, FIG. 1 to FIG. 3)
Patent Document 2: Japanese Patent Application Laid-open No. 2001-180916 (Paragraphs 0034, 0050 to 0051, FIG. 1 to FIG. 3)

SUMMARY OF THE INVENTION

Problems to be Solved by the Invention

According to the method in which the ozone generating device is kept heated, however, too many energy are required and the operation of the ozone generating device has to be suspended. Meanwhile, in the case of purging, ozone generation has to be interrupted, so that at every interruption, an instrument that is executing treatment using the produced ozone has to be suspended.

This invention has been made to solve the problems as described above, and an object thereof is to achieve a highly-reliable ozone generating system which can maintain a stable operating state without interrupting generation of ozone.

Means for Solving the Problems

An ozone generating system according to the invention is characterized by comprising: an ozone generating device including discharge electrodes that are arranged opposite to each other to thereby form a discharge space; a gas supplying device that supplies an oxygen-containing gas as a source gas for generating ozone to the discharge space; a power source device that supplies power for discharging to the discharge electrodes; a temperature adjustment device that adjusts a temperature of the discharge electrodes; a control unit that controls the gas supplying device, the power source device and the temperature adjustment device, to thereby control an operation of the ozone generating device; and a detection unit that detects an ozone generation parameter in the ozone generating device;

wherein, the control unit causes the temperature of the discharge electrodes to increase up to a vaporizing temperature of dinitrogen pentoxide by controlling the temperature adjustment device and the gas supplying device or the temperature adjustment device and the power source device in their cooperative manner, on the basis of the ozone generation parameter output from the detection unit, to thereby control the operation of the ozone generating device to be switched from a normal operation mode to a cleaning operation mode in which surfaces of the discharge electrodes and the discharge space are cleaned up in a state of continuing generation of ozone in the discharge space.

Further, an ozone generation method according to the invention is an ozone generation method in which an oxygen-containing gas is supplied to an ozone generating device including discharge electrodes that are arranged opposite to each other to form a discharge space, to thereby generate ozone using an electric discharge in the discharge space, said method characterized in that: an ozone generation parameter in the ozone generating device is detected, and then, by control of a temperature of cooling water for cooling the discharge electrodes and a pressure of the gas, or the temperature of the cooling water for cooling the discharge electrodes and an applied power to the discharge electrodes in their cooperative manner, and based on the value of the ozone generation parameter, a temperature of the discharge electrodes is increased up to a vaporizing temperature of dinitrogen pentoxide, to thereby clean up surfaces of the discharge electrodes and the discharge space in a state of continuing generation of ozone in the discharge space.

Effect of the Invention

According to the ozone generating system and the ozone generation method of the invention, when an abnormality is detected during generation of ozone, the temperature of the electrodes is increased so that a saturated vapor pressure of dinitrogen pentoxide becomes higher than the gas pressure. Thus, dinitrogen pentoxide is vaporized, and therefore, it is possible to achieve a highly-reliable ozone generating system or to generate ozone, while maintaining a stable operating state without interrupting generation of ozone.

BRIEF DESCRIPTION OF THE DRAWINGS

FIGS. 2A and 2B are cross-sectional views each showing a structure of a discharge electrode unit provided in an ozone generating device that is a component of the ozone generating system according to Embodiment 1 of the invention.

MODES FOR CARRYING OUT THE INVENTION

Embodiment 1

Figure 1:
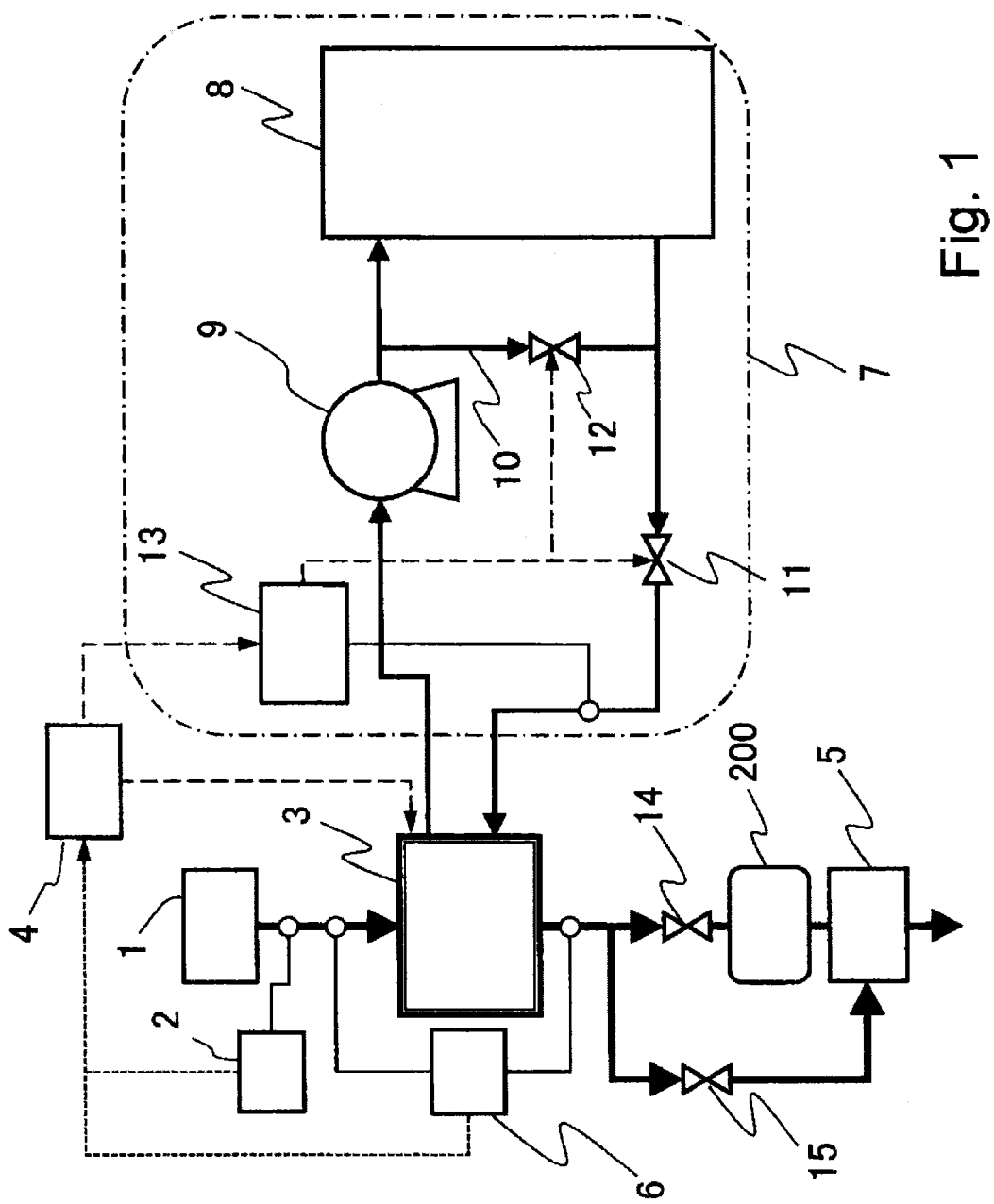
FIG. 1 is a systematic diagram showing a configuration of an ozone generating system according to Embodiment 1 of the invention.
Figure 3:
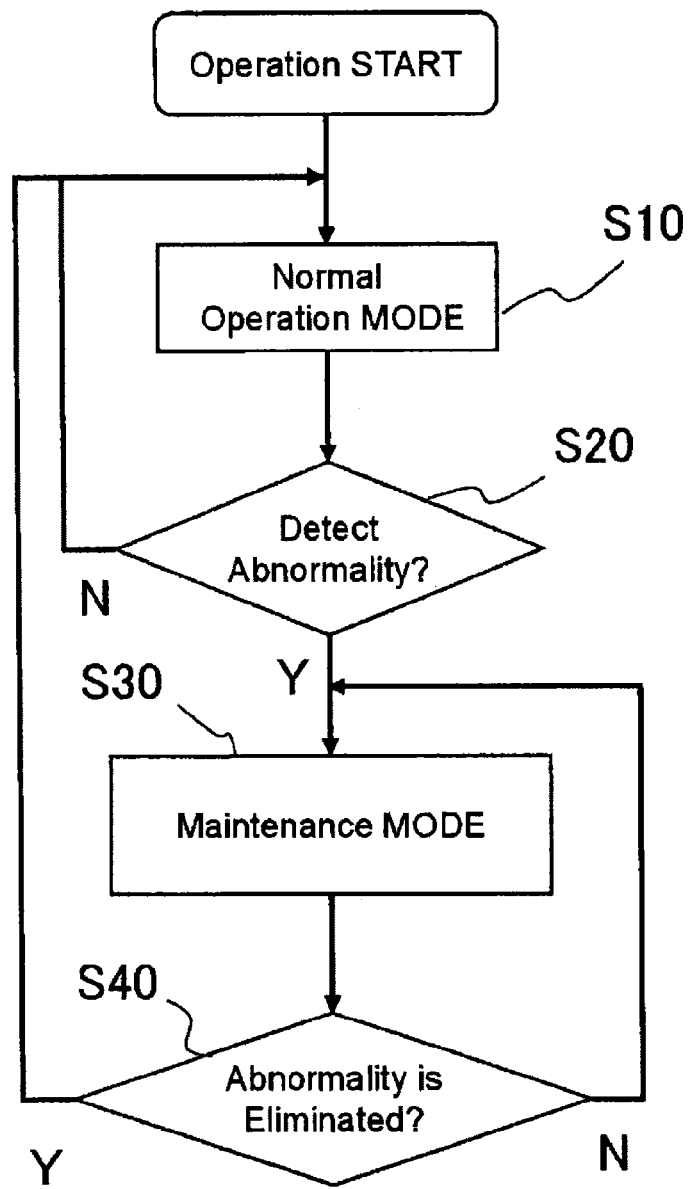
FIG. 3 is a flowchart for illustrating a method of operating the ozone generating system according to Embodiment 1 of the invention.
Figure 4:
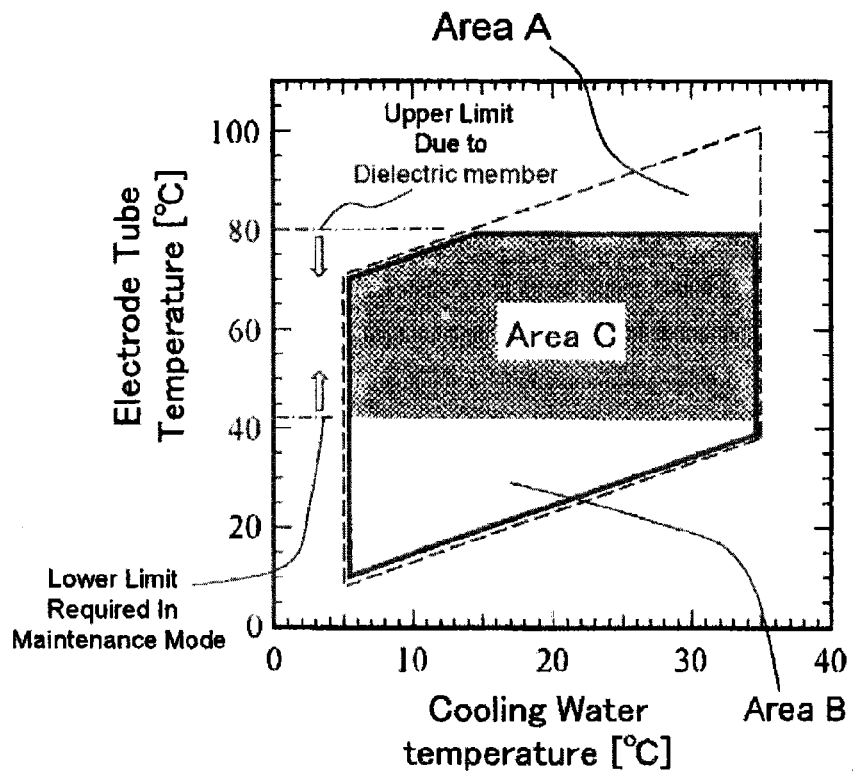
FIG. 4 is a diagram for illustrating a range of operational condition in the ozone generating system according to Embodiment 1 of the invention.
Figure 5:
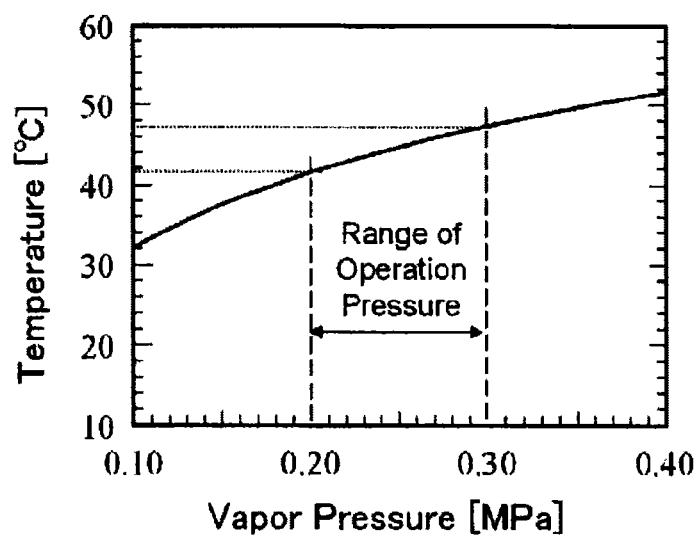
FIG. 5 is a diagram showing a relationship between a temperature of $N_2O_5$ and its saturated vapor pressure.

FIG. 1 through FIG. 6 are given for illustrating an ozone generating system according to Embodiment 1 of the invention and a method of operating the same, in which FIG. 1 is a systematic diagram showing an instrumental configuration, a control system, a flow system and the like, of the ozone generating system. FIG. 2A and FIG. 2B are given for illustrating a configuration of a discharge electrode unit of the ozone generating system, in which FIG. 2A is a cross-sectional view showing a cross-sectional plane parallel to a gas flow direction in the discharge electrode unit, and FIG. 2B is a cross-sectional view showing a sectional plane perpendicular to the gas flow direction taken along A-A line in FIG. 2A. Further, FIG. 3 is a flowchart for illustrating a method of operating the ozone generating system, and FIG. 4 is a diagram showing a range of operational condition in the ozone generating system, said range being represented by a relationship between a temperature of cooling water supplied to the ozone generating device and a temperature of an electrode tube in the discharge electrode unit. Besides, FIG. 5 is a diagram showing a relationship between a temperature of $N_2O_5$ as a removal target in the discharge electrode unit, and its saturated vapor pressure.

The configuration of the ozone generating system according to Embodiment 1 of the invention will be described.

As shown in FIG. 1, the ozone generating system includes: a gas supplying device 1 for pressurizing and supplying air as a source gas; an ozone generating device 3 that generates ozone from the pressurized air supplied from the gas supplying device 1 to thereby output an ozonized gas; an ozone removal treatment unit 5 that removes ozone from a surplus ozonized gas discharged from an ozone utilization facility 200 that executes ozonation using the output ozonized gas, or from the ozonized gas transported thereto without passing through the ozone utilization facility 200; a cooling system (temperature adjustment device 7) that serves as a temperature controller for adjusting a temperature of the ozone generating device 3, and adjusts the temperature by cooling; and a control unit 4 that performs operational control of the generating system. Here, the ozone generating device 3 used is referred to as an air-source ozone generating device.

Besides, in a gas flow system indicated by extra-thick lines in the figure, there are provided: a dew-point measuring unit 2 that measures a dew point of the gas supplied from the gas supplying device 1 to the ozone generating device 3; a differential-pressure measuring unit 6 that measures a differential pressure produced by the ozone generating device 3; and valves 14 and 15 that switch whether the ozonized gas outputted by the ozone generating device 3 is to be transported to the ozone utilization facility 200 or to be transported to the ozone removal treatment unit 5, or that adjust a ratio the ozonized gas to be transported to both of these.

The gas supplying device 1 represents gas cylinder equipment, a compressor, a blower and the like, to which a water removal unit configured with a source-gas cooling/drying device may be provided if necessary. As the water removal unit, that of a heating regeneration type or pressure regeneration type is used. With respect to the source gas, the pressurized air is supplied as an oxygen-containing gas. The ozone utilization facility 200 represents a water treatment facility, a waste-water treatment facility, any of a variety of oxidation treatment facilities, a semiconductor/liquid crystal manufacturing facility or the like. For example, in the case of application to a water treatment facility or the like, that is, when an amount of ozone to be generated is several kg/h to several tens kg/h, the gas supplying device 1 is preferable to employ a blower and the water removal unit is suitable to employ that of a heating regeneration type, in consideration of cost performance.

In the cooling system (temperature adjustment device 7), there are provided: a circulation pump 9 for circulating the cooling water for cooling the ozone generating device 3; a cooler 8 for cooling the cooling water increased in temperature due to absorption of heat generated in the ozone generating device 3; flow-rate adjustment valves 11 and 12 for adjusting a flow rate of the cooling water in the cooling system (temperature adjustment device 7); and a temperature adjuster 13 for adjusting degrees of lifts of the flow-rate adjustment valves 11 and 12 to thereby adjust a temperature of the water to be supplied to the ozone generating device 3.

Further, the ozone generating device 3, the circulation pump 9, the cooler 8 and the flow-rate adjustment valve 11 are connected by pipings indicated by thick lines in the figure in a looped form, to thereby constitute a main cooling line that circulates through between the ozone generating device 3, the circulation pump 9 and the cooler 8. On the other hand, a bypass piping 10 is connected, through the flow-rate adjustment valve 12, to a middle of the piping between the circulation pump 9 and the cooler 8 and to a middle of the piping between the cooler 8 and the flow-rate adjustment valve 11, to thereby constitute a bypass line that circulates through between the ozone generating device 3 and the circulation pump 9. Accordingly, by adjusting the degrees of lifts of the flow-rate adjustment valves 11 and 12 using the temperature adjuster 13, the temperature of the water to be supplied to the ozone generating device 3 is adjusted to thereby control the temperature of the ozone generating device 3.

The cooler 8 represents any of a variety of heat exchanger coolers of a liquid-to-liquid or liquid-to-gas type, a chiller of a liquid-fluorocarbon refrigerant type, or the like. Here, the cooling water represents usual tap water; however, there may be cases where an antifreeze liquid or a scale removing agent is mixed therein, or ion-exchanged water or purified water is used instead.

Meanwhile, in the figure, portions indicated by "○" at destinations of thin lines connected from the dew-point measuring unit 2, the differential-pressure measuring unit 6 and the temperature adjuster 13, represent placement positions of a dew point sensor and a pressure sensor in the gas flow system, a temperature sensor in the cooling line, respectively, and their respective sampling ports. Further, dotted lines represent data signal lines from the dew-point measuring unit 2 and the differential-pressure measuring unit 6 to the control unit 4, and broken lines represent control signal lines from the control unit 4 and the temperature adjuster 13.

In such an ozone generating system, the source gas supplied from the gas supplying device 1 is introduced into the ozone generating device 3 through the dew-point measuring unit 2, and the ozonized gas produced by the ozone generating device 3 is supplied to the ozone utilization facility 200 through the valve 14 or to the ozone removal treatment unit 5 through the valve 15. Further, the surplus ozonized gas after passing through the ozone utilization facility 200 is also supplied to the ozone removal treatment unit 5. On this occasion, a dew point of the source gas supplied to the ozone generating device 3 and a pressure loss produced by the ozone generating device 3 are measured by the dew-point measuring unit 2 and the differential-pressure measuring unit 6, respectively, and they are being monitored by the control unit 4. Although heat is generated in the ozone generating device 3, its temperature is controlled because of circulation of the cooling water with a predetermined temperature by the cooling system (temperature adjustment device 7).

Next, the configuration of the ozone generating device 3 will be described.

The ozone generating device 3 is an ozone generating device of a silent discharge type having a dielectric member interposed between electrodes. As to the shape of electrode, although various forms may be applied, such as of a parallel plate type, a cylindrical tube type, etc., here, description will be made citing as an example, a cylindrical tube type discharge electrode unit 30 as shown in FIG. 2A and FIG. 2B. The discharge electrode unit 30 is provided with a high-voltage electrode tube 304 as a high-voltage electrode, that is configured with a high-voltage electrode 303 that forms a cylindrical shape and a dielectric member 302 comprising a glass tube that is unified with the high-voltage electrode 303 so as to cover the outer circumference surface of the high voltage electrode 303 and one end side thereof. Further, as an electrode connected to the ground, a grounding electrode (tube) 301 is provided that is arranged coaxially with the high-voltage electrode tube 304 so that the inner circumference surface of the grounding electrode is opposite to the outer circumference surface of the high voltage electrode tube 304 with a predetermined interval therebetween (=a space length (gap length) "d" to be described later), and cooling water 306 flows at the outer circumference side of the grounding electrode.

The space between the outer circumference surface of the dielectric member 302 and the inner circumference surface of the grounding electrode (tube) 301 is given as a discharge space 305. The discharge space 305 is a gas flow passage for flowing the source gas in a direction indicated by an arrow in the figure, and also a space for causing a discharge by an AC high voltage applied between the grounding electrode (tube) 301 and the high-voltage electrode tube 304. Further, in the high-voltage electrode 303, a power feeding member 307 for applying a high voltage is inserted from the other end side being opened, and at an end portion on the one end side covered with the dielectric member 302, an electric field mitigation layer 308 for suppressing a creeping discharge is provided. Note that, in FIG. 2B, the illustration of the power feeding member 307 is omitted.

In the ozone generating device 3, according to the required ozone generation amount, many number of the discharge electrode units 30 as described above are connected in parallel and stored in a single tank. Further, there are provided an unshown power source device for applying an AC high voltage and so on, so that a given AC voltage is applied to the respective discharge electrode units 30 by use of the power source device being activated under the control of the control unit 4. Thus, the source gas is supplied to the discharge space 305 of each of the discharge electrode units 30 while an AC high voltage is applied through each power feeding member 307, so that ozone is generated.

Next, description will be made for a configuration and an operational condition of the ozone generating device 3, that are well-suited when air or a nitrogen-rich oxygen mixed gas is used as the source gas, and that are common for the ozone generating systems according to Embodiment 1 and the subsequent embodiments.

In the configuration of the discharge electrode unit 30 of the ozone generating device 3 according to each of the embodiments, the space length d (hereinafter, referred to as a gap length d) of the discharge space 305 is set to 0.3 mm or more but 0.6 mm or less, preferably to 0.4 mm or more but 0.6 mm or less. By setting the gap length d to 0.6 mm or less, the cooling efficiency of the discharge space 305 is enhanced so that it is confirmed that the ozone generation efficiency is enhanced, whereas by setting the gap length d to less than 0.3 mm, an intensity of the electric field in the discharge space 305 becomes too high, so that the production amount of nitrogen oxide is increased to thereby reduce the ozone generation efficiency. Further, if the gap length d is set to exceed 0.6 mm, the temperature of the discharge space 305 rises excessively to thereby reduce the ozone generation efficiency. Accordingly, when air or a nitrogen-rich oxygen mixed gas is used as the source gas, there are optimum values for the gap length d, so that it is set to 0.3 mm or more but 0.6 mm or less.

Furthermore, the ozone generation efficiency changes depending not only on the gap length d but also on a gas pressure P in the discharge space 305. In the operational condition of the ozone generating system according to each of the embodiments, the gas pressure P is set to 0.2 MPaG (G: gauge pressure) or less, preferably to 0.1 MPaG or more but less than 0.2 MPaG. An increase in the gas pressure P suppresses production of nitrogen oxide in the discharge space 305. Further, the upper and lower limits of the gas pressure P are determined also by a discharge pressure of the gas supplying device 1, for example, by a maximum discharge pressure of about 0.2 MPaG in the case of the blower, and by an ozonized gas pressure required for the ozone utilization facility 200 (for example, about 0.1 MPaG in the case of a water treatment apparatus). Further note that, by setting the gas pressure P to less than 0.2 MPaG, the ozone generating device 3 becomes not to meet "a Code for Second Class Pressure Vessels", so that the legal restriction is reduced thereby making it easier to handle the device.

Namely, in each of the embodiments, the gap length d is set to 0.3 mm or more but 0.6 mm or less, preferably to 0.4 mm or more but 0.6 mm or less, and the gas pressure P is set to 0.1 MPaG or more but less than 0.2 MPaG as a pressure that can achieve a higher ozone generation efficiency and can further reduce the production amount of nitrogen oxide.

Meanwhile, a density of applied power to be applied to the ozone generating device 3 (applied power per unit area of electrode) is from 0.05 to 0.6 $W/cm^2$, preferably from 0.1 $W/cm^2$ to 0.3 $W/cm^2$. The applied power density is also an indicator for representing the size of the ozone generating device 3, so that the device becomes smaller as the applied power density becomes higher. On the other side, an increase in the applied power density causes temperature rise in the discharge space 305, so that the ozone generation efficiency is reduced. From the viewpoints of generation of ozone by electric discharge and suppression of nitrogen oxide production, the temperature of the discharge space 305 is preferably to be low, and thus it is required not to make the applied power density too high. However, when the applied power density becomes less than 0.05 $W/cm^2$, variation occurs in discharging condition. This makes it unable to maintain a stable discharge and thus is not preferable.

Next, description will be made for a phenomenon that occurs in the ozone generating device 3 with the above configuration and operational condition, and for problems with the conventional ozone generating systems.

The dew point of the source gas served to the ozone generating device 3 is generally set to minus 60° C. or lower (dew point at the atmospheric pressure). As a matter of course, if the dew point becomes higher, the amount of water associated with the source gas and flowing into the ozone generating device 3 is increased, thereby affecting the ozone generation efficiency and causing production of nitric acid in the ozone generating device 3. Thus, it has been not recommended to operate at a dew point higher than the above dew point.

However, converting the water amount in the source gas with a dew point of minus 60° C. to a volume concentration in the source gas results in approx. 10 ppmv, and thus, even with a dew point of minus 70° C., several ppmv of water is assumed to be associated therein. So long as the dew point is kept to be minus 60° C. or lower, an effect on the ozone generation efficiency is small; however, the inventors of this invention have found that, even if the dew point is lowered up to about minus 60° C. to minus 80° C., there is a tendency that accumulation of a product and production of nitric acid in the ozone generating device 3 are enhanced due to a small amount of water, as a result of continuous operation for a long period.

For example, in a normal operational condition of the ozone generating device 3 with the above configuration, the temperature of the discharge space 305 becomes about 40° C. in summer when the temperature of the cooling water becomes higher, and becomes about 18° C. in winter when the temperature of the cooling water becomes lower. In consideration of the aforementioned range of the gas pressure P and the saturated vapor pressure of $N_2O_5$ described later, the temperature of the ozone generating device 3 even in summer is thought to be a temperature at which $N_2O_5$, a discharge product, is in a state of solid. Further, other than in midsummer, the temperature of the ozone generating device 3 even falls below a sublimation point of $N_2O_5$ (32.4° C.) under atmospheric pressure, so that hygroscopic $N_2O_5$ in a state of sold reacts with the small amount of water to produce nitric acid. Further, because of production of nitric acid, a ferric nitrate, $Fe(NO_3)_3$, that is in a state of hygroscopic solid, is also produced to become accumulated in the ozone generating device 3. However, in the conventional ozone generating systems, what is prerequisite therefor is a periodic maintenance, such as, a cleaning-up of the grounding electrode (tube) 301 and the high-voltage electrode tube 304 to be executed by making the ozone generating device 3 open to atmosphere, and thus, it has been thought that any major problem would not practically arise with respect to the above range of dew point.

Further, when the dew point becomes minus 40° C. or higher, the water concentration exceeds 10 ppmv and, at minus 20° C. the water of exceeding 1000 ppmv is associated with the source gas. On this occasion, an abrupt reduction emerges in the ozone generation efficiency, and the conversion of $N_2O_5$ existing as a solid to nitric acid, the accumulation/adherence of $Fe(NO_3)_3$ in the device, and the extensive corrosion of metal members by nitric acid, are unavoidable. On the other hand, in order to achieve a water concentration of 0.1 ppmv or less that is assumed to be less effective on the production of nitric acid in the ozone generating device, it is required to set the dew point of the source gas to approx. minus 90° C. or lower, so that a gas supplying device and a water removal device that achieve this requirement are technically difficult to be realized or extremely expensive, and thus are unrealistic devices.

Thus, also from the above viewpoint, it has been recommended by the makers to perform the work for cleaning up the electrode unit, or the like through the periodic maintenance. Namely, it is required as a minimum requirement to keep the dew point of the gas in a range from minus 80° C. to minus 60° C.; however, it has been found that, even in this range of dew point that has been generally thought not to cause any problem, at the time of operation for a long period, sufficient care has to be taken for the production/accumulation of the discharge product and nitric acid.

Meanwhile, in the aforementioned ozone generating device 3 in which the gap length d is adjusted to 0.6 mm or less, the differential pressure, namely, the gas pressure loss, is several kPa to several tens kPa, and it becomes higher as the gap length d becomes shorter. Further, when the discharge product adhered to the portion of the electrode unit facing to the discharge space 305, the pressure loss increases, so that an adhering/accumulating state of the substance produced in the discharge space can be recognized by way of the pressure loss. As described previously, the adherence of the discharge product depends on the water amount associated with the source gas and the temperature of the discharge space 305. Since an increasing phenomenon in the differential pressure of the ozone generating device 3 can be confirmed from a timing where the water is introduced into the ozone generating device 3 and the product begins to adhere, it is possible to prevent beforehand the adherence of the discharge product through monitoring the gas dew point, and to confirm the adherence of the discharge product before becoming significant through monitoring the differential pressure. Thus, although it is best to monitor both of the gas dew point and the differential pressure, only by monitoring the differential pressure, it becomes possible to early find the adherence/accumulation of the discharge product. According to the conventional ozone generating devices whose gap length d exceeds 0.6 mm, since the differential pressure itself is small, it is unable to sensitively detect the adherence of the discharge product. Thus, at the stage it could be detected, the adherence of the discharge product has already become significant, so that as aforementioned, it is not possible to prevent beforehand the adherence.

Note that, as to the ozone generating device 3, there are two types of gas-pressure control methods including a case where a gas pressure of the device's inlet-side is adjusted to be constant, and a case where a pressure of the device's outlet-side is adjusted to be constant. When the pressure loss of the device is increased in the former case, the gas pressure of the device's outlet side becomes lower, and in the latter case, the gas pressure of the device's inlet side becomes higher. In this embodiment, it is of course most preferable to manage the differential pressure of the device; however, depending on the pressure control method of the ozone generating device 3, it is allowable, as a substitute method of monitoring the differential pressure, to monitor either one of the pressures at the device's inlet and outlet sides and to manage its variation relative to a predetermined value each.

As described above, in the ozone generating system according to this embodiment, the gap length is set to be short i.e. 0.6 mm or less, and the operational condition of the ozone generating device 3 using air as a source gas is optimized. However, as a result of experiments by the inventors of this invention, it is found that there is a possibility of occurrence of an event that has been not taken into consideration in the conventional ozone generating devices. What is the possibility is that, by setting the gap length to 0.6 mm or less, the discharge space 305 of the ozone generating device 3 is choked off during operation, although depending on the dew point of the source gas from the gas supplying device 1.

In the ozone generating device 3, during its initial operation, a metal oxide resulting from a stainless steel that is a component of the grounding electrode (tube) 301, adheres to surfaces of the grounding electrode (tube) 301 and the high-voltage electrode tube 304, so that the differential pressure of the ozone generating device 3 is somewhat increased; however, this increase in the differential pressure will be stabilized after the operation for several tens of hours. As to the ozone generating device 3 with the short gap length d according to this embodiment, however, even when the gas dew point is minus 60° C. or lower, the differential pressure tends to be increased more due to the accumulation of $N_2O_5$ and $Fe(NO_3)_3$ in the ozone generating device 3 at the time of operation for a long period.

For example, in a condition where the temperature of the discharge space 305 is lower than the sublimation point of $N_2O_5$, when the dew point of the source gas is minus 50° C. or higher, the adherence of the discharge product to the grounding electrode (tube) 301 and the high-voltage electrode tube 304, becomes significant, and when the dew point of the gas is minus 40° C. or higher, it has been confirmed that liquid is precipitated from around the ozonized gas outlet. In addition, when the dew point of the gas becomes minus 20° C. or higher, it has been confirmed that a liquid that is very much like concentrated nitric acid is accumulated at around the ozonized gas outlet. At the time the above liquid is precipitated, an abrupt increase in the differential pressure of about 10 kPa relative to the initial differential pressure has been also confirmed. With the adherence of the discharge product becoming significant, the grounding electrode (tube) 301 and the high-voltage electrode tube 304 adhered to each other, thus falling in a state unable to be taken out. That is, in that state, the open-to-atmosphere maintenance itself is unable to be executed, and in addition, the state of the discharge electrode unit 30 is further degraded due to the water in the atmosphere. Accordingly, the inventors has come to a conclusion that a maintenance is required for the discharge electrode unit 30 without making the ozone generating device 3 open to atmosphere.

In the ozone generating device 3 according to this embodiment, since the gap length d is set to 0.6 mm or less, the amount of nitrogen oxide produced tends to be increased in comparison to the conventional ozone generating devices with a gap length d of exceeding 0.6 mm. In addition, since the interval (gap length d) of the discharge space 305 as the flow passage becomes narrow, there is an increase in likelihood that the discharge space 305 of the ozone generating device 3 is choked off during operation. However and on the other side, the differential pressure of the ozone generating device 3 becomes larger than in the conventional cases, so that it becomes possible to sensitively detect the accumulation/adherence of the discharge product produced in the discharge space 305, from the outside of the ozone generating device 3. In the conventional ozone generating devices, since the differential pressure of each ozone generating device is small, it is unable to detect the state of the discharge space from the outside of the ozone generating device.

Thus, in spite of taking a risk of nitric acid production, the open-to-atmosphere maintenance was essential, and the discharge electrode unit had to be confirmed actually by eyes. Or, at the time of making the device open to atmosphere, the damage according to the accumulation/adherence state of the discharge product in the discharge space had become significant. In that regard, in the ozone generating device 3 according to this embodiment, by the use of the fact that the differential pressure of the ozone generating device 3 becomes larger than in the conventional cases, the state of the discharge space 305 and the discharge electrode unit 30 can be confirmed from the outside, so that it becomes possible to detect beforehand the accumulation/adherence of the discharge product. Thus, the open-to-atmosphere maintenance that has heretofore been practiced becomes unnecessary.

Therefore, the ozone generating system according to this embodiment is configured to execute operational control as described below.

In the ozone generating system, there are set two operation modes of (1) a normal operation mode and (2) a maintenance mode. Further, the control unit 4 is configured to detect an increase in the differential pressure or an increase in the gas dew point, that is a sign of abnormality in the discharge electrode unit 30, on the basis of the signal from the dew-point measuring unit 2 or the differential-pressure measuring unit 6, to thereby cause a switching between these operation modes in a state where the discharge in the ozone generating device 3 for generating ozone is continued without change. It is noted that the "abnormality" shown here represents a sign or an initial stage of the accumulation/adherence of the discharge product, and does not represent an electrical abnormality in a discharge, insulation or the like.

As shown in FIG. 3, when the operation of the ozone generating system is started, an operation in the normal operation mode is initiated for generating ozone according to an amount of ozone required for the ozone utilization facility 200 (Step S10). This normal operation mode is continued according to a request by the ozone utilization facility 200 so long as the sign of abnormality as described above is undetected (Step S20, "N"). Meanwhile, the control unit 4 initiates an operation in the later-described maintenance mode (Step S30), when it determines that there is an accumulation of the discharge product in the discharge electrode unit 30 or a sign thereof (Step S20, "Detect Abnormality=Y"), on the basis of the signal from the differential-pressure measuring unit 6 and in the case where the differential pressure exceeded a predetermined value or its rising speed exceeded a predetermined value. Alternatively, the control unit initiates an operation in the maintenance mode (Step S30), when it determines that there is an accumulation of the discharge product in the discharge electrode unit 30 or a sign thereof (Step S20, "Detect Abnormality=Y"), on the basis of the signal from the dew-point measuring unit 2 and in the case where the dew point was increased to a predetermined value or more.

In the maintenance mode, also on the basis of the differential pressure or the dew point, it is determined whether the abnormality is eliminated or not (Step S40), and unless otherwise eliminated (Step S40, "N"), this mode is continued. Note that in the general practice of the ozone generating system, namely, in the standard operation mode in this embodiment, the operation does not always proceed with a constant ozone generation amount, a constant applied power density and a constant cooling water temperature, and the practical condition changes depending on a condition of the ozone utilization facility 200-side, a variation of the cooling water temperature associated with a seasonal change, and the like.

Next, details of the operational condition including that in the normal operation mode and a phenomenon associated with the condition, will be described.

The adherence of the discharge product to be discussed in this embodiment, can be controlled by an average temperature in the discharge space 305 and a surface temperature of the electrode tube in contact with the discharge space 305 (the inner circumferential surface of the grounding electrode 301 and the outer circumferential surface of the high-voltage electrode tube 304). To say in detail, the surface temperature of the high-voltage electrode tube facing to the discharge space 305 always becomes higher by several ° C. to 10° C. than the average temperature of the discharge space 305, and their respective temperatures in a steady state are determined unambiguously from the temperature of the cooling water caused to flow through a flow passage formed in the discharge electrode unit 30, the applied power density and the gap length d. The operation modes of this embodiment will be discussed using the surface temperature of the high-voltage electrode tube (hereinafter, referred to as an electrode tube temperature) as an example.

FIG. 4 shows a relationship between the temperature of the cooling water supplied to the ozone generating device 3 and the electrode tube temperature. In the figure, an area A surrounded by broken line stands for a variation range of the electrode tube temperature when the gap length d the applied power density to the ozone generating device 3 and the temperature of the supplied cooling water are given as operation parameters. The range of the gap length d is set from 0.3 to 0.6 mm, the range of the applied power density is set from 0.05 to 0.6 W/cm$^2$, and the range of the cooling water temperature is set from 5° C. (for winter) to 35° C. (for summer). When the gap length d, the applied power density, and the cooling water temperature are set to their respective maximum values (d=0.6 mm, 0.6 W/cm$^2$, 35° C.), the electrode tube temperature becomes highest (100° C.). In contrast, when the gap length d, the applied power density, and the cooling water temperature are set to their respective minimum values (d=0.3 mm, 0.05 W/cm$^2$, 5° C.), the electrode tube temperature becomes lowest (7° C.).

However, since an operation-allowable temperature is set for the glass tube as the dielectric member 302, the upper limit of the electrode tube temperature becomes 80° C. This is because of consideration of reduction in dielectric breakdown strength of the glass tube by its temperature rise, and based on the fact that when the temperature of the glass tube exceeds 80° C., the dielectric breakdown strength begins to be reduced, thereby increasing a probability of dielectric breakdown. Thus, within the area A, an area B surrounded by solid line becomes a temperature range that allows an operation as the ozone generating device 3. Note that, in the figure, although the solid line and the broken line, for example, are illustrated as displaced to each other, this is just for convenience sake of making the solid line and the broken line easy to differentiate, and actually, they are overlapped.

In the normal operation mode and the maintenance mode disclosed in this embodiment, the electrode tube temperature, which varies depending on the cooling water temperature, the applied power density and the gap length d (this is fixed for every device), has to be controlled to fall in a range of the area B (not more than the upper limit temperature due to the dielectric member 302), so that this condition is installed in the control unit 4. In the case of exceeding the temperature condition, since a failure possibly occurs in the ozone generating device 3, the discharge is suspended.

Next, the respective operation modes will be described.

<Normal Operation Mode>

The normal operation mode is applied to the case of directly supplying the generated ozonized gas to the ozone utilization facility 200, and does not represent such a state judged to indicate a sign of abnormality by the signal output from the dew-point measuring unit 2 or the differential-pressure measuring unit 6, but represents a state where an operation is normally proceeding. For example, when the gas dew point is kept to minus 60° C. or lower, and the differential pressure falls in less than approx. 1.5 times the initial differential pressure with no abrupt change, the control unit 4 determines that there is no sign of abnormality (Step S20, "N"), to thereby continue the normal operation mode. On this occasion, in order to control the applied power density and the cooling water temperature so that the temperature condition of the electrode tube temperature falls within the range of the area B in FIG. 4, commands are sent to an unshown power source for activating the ozone generating device 3 and the temperature adjuster 13 of the cooling system (temperature adjustment device 7), That is, in a situation where no sign of abnormality is determined, even if there are $N_2O_5$ produced with ozone, nitric acid produced by the reaction of water in the source gas and $N_2O_5$, and $Fe(NO_3)_3$ produced by the reaction of nitric acid and the metal member, the existing amount of them is in a level not problematic at all for the operation of the ozone generating device 3. In this state, in the cooling system (temperature adjustment device 7), the flow-rate adjustment valve 11 is placed in the open state, and the flow-rate adjustment valve 12 is placed in a closed state, so that the cooling water does not flow through the bypass piping 10. Namely, the cooling water having been cooled to a temperature corresponding to the capacity of the cooler 8 is supplied to the ozone generating device 3. It should be said here that the bypass piping 10 is a piping different to that served for a flow-rate adjustment in a general cooling facility. After the specifications of the cooler and the circulation pump are determined in consideration of a required cooling capacity and a flow rate of the cooling water to be supplied for a target to be cooled, a general bypass piping is installed usually in the cooler in order to adjust the cooling ability by the specifications. However, the bypass piping 10 shown in this embodiment is not that used for adjusting the cooler/circulation pump-side ability.

<Maintenance Mode>

The maintenance mode is executed when a signal indicative of such data that causes the control unit 4 to determine that a sign of abnormality emerges, is sent from at least one of the dew-point measuring unit 2 and the differential-pressure measuring unit 6. That is, this mode is an operation mode to be executed when the control unit determined that there is a sign of abnormality occurrence or a state of abnormality occurrence for the operation of the ozone generating device 3, because of $N_2O_5$ produced with ozone, nitric acid produced by the reaction of water in the source gas and $N_2O_5$, and $Fe(NO_3)_3$ produced by the reaction of nitric acid and the metal members, having become significant. Namely, this operation mode is executed in a state where it is highly likely that the adhered amount of the above products in the ozone generating device 3 exceeds the value of that in the normal operation, or where the amount exceeded the value.

Specifically, in the maintenance mode, the control unit 4 sets the operational condition so that the electrode tube temperature falls in an area C (hatched portion) in FIG. 4. This area C represents a range that is placed in the area B as a working-operation allowable range, but not less than the lower limit of a later-described temperature necessary for removing solid $N_2O_5$ by vaporization. Since the mode is basically used for increasing the temperature, at least one of increasing the applied power density and increasing the cooling water temperature is performed. Thus, a variation occurs in the amount of ozone to be generated, so that the ozonized gas is supplied to either one or both of the ozone utilization facility 200 through the valve 14 and the ozone removal treatment unit 5 through the valve 15, according to the requirement of the treatment processing side to which the ozonized gas is supplied.

The temperature is increased by the manipulation of the cooling system (temperature adjustment device 7), namely, the temperature of the cooling water is adjusted by the following manner. If the temperature adjuster 13 places the flow-rate adjustment valve 11 and the flow-rate adjustment valve 12 both in open state, the cooling water flows not only through the cooler 8 but also through the bypass piping 10. That is, although the flow rate of the cooling water supplied to the ozone generating device 3 is maintained, since a portion thereof is fed back to the ozone generating device 3 without being subjected to heat removal by the cooler 8, the temperature of the cooling water supplied to the ozone generating device 3 becomes higher than at the time of the normal operation mode.

At that time, in the control unit 4, a table is being stored that represents a relationship of the electrode tube temperature relative to the applied power density and the cooling water temperature. Then, in the case, for example, where the applied power is not changed and only the cooling water temperature is changed, the control unit outputs, based on the density of power applied to the ozone generating device 3, the command value of the cooling water temperature to the temperature adjuster 13 so that the temperature adjuster 13 causes the electrode temperature to reach the temperature required in the maintenance mode. The temperature adjuster 13 adjusts the lifts of the flow-rate adjustment valve 11 and the flow-rate adjustment valve 12 so as to achieve the commanded cooling water temperature.

When the control of the flow-rate adjustment valves 11,12 is initiated by the temperature adjuster 13, the temperature of the cooling water supplied to the ozone generating device 3 is increased, and in association therewith, the electrode tube temperature is increased (of course, an average temperature in the discharge space 305 is increased in association with the increase in the electrode tube temperature). On this occasion, further, the density of power applied to the ozone generating device 3 is manipulated to thereby finely adjust the electrode tube temperature to be maintained in the area C.

In order to increase the electrode temperature and stabilize it in the area C, it is required to control appropriately both of the cooling water temperature and the applied power density. By controlling both of them in their cooperative manner, it is possible to promptly and accurately control/stabilize the electrode tube temperature. At the time of switching to the maintenance mode, the lifts of the flow-rate adjustment valves 11 and 12 are adjusted so that the electrode tube temperature is maintained in the area C according to the applied power density in a given operation state.

At the discharge load like in the ozone generating device 3, such a possibility is thought that a rapid change in operational condition in the operating (ozone generating) state possibly causes an unexpected failure (said extremely, breakage of the electrode tube or occurrence of abnormal discharge). Thus, it is preferable that the change in the condition be carried out moderately. Following to a change in each of the electrode tube temperature and the discharge space temperature, changes occurs in the gas pressure and the dielectric constant and dielectric loss of the material of electrode tube, so that the electrical characteristic in the discharge load changes. Thus, a rapid change in the operational condition with disregard of the change in the discharge load is undesirable. An increase in the electrode tube temperature in association with the increase in the cooling water temperature is a relatively moderate phenomenon, and from this viewpoint, the manipulation of the cooling water temperature is favorable as a first step for changing the operational condition. However, because of the moderate phenomenon, it takes time for the electrode tube temperature to reach a preset temperature. Further, solely by adjusting the lifts of the flow-rate adjustment valves 11,12, namely, solely by increasing the cooling water temperature, it is difficult to promptly and highly accurately make the electrode tube temperature to be maintained in the area C.

Meanwhile, an increase in the electrode tube temperature due to manipulation of the applied power density that is controlled by at least one of the current, the voltage and the power of the ozone generating device 3, is a rapid phenomenon because this temperature increase is caused by adjusting an electrical load for the electrode tube itself, and in addition, a trace amount thereof can be controlled, so that its highly-accurate manipulation/control can be achieved. Accordingly, at the time of the first step of adjusting the lifts of the flow-rate adjustment valves 11,12 by the temperature adjuster 13, the electrode tube temperature is adjusted macroscopically to reach to near the area C or in the area C while suppressing a rapid load relative to the discharge load by moderately changing the electrode tube temperature. Then, with respect to the electrode tube temperature adjusted in the first step, a cooperative control for highly accurately and stably maintaining the temperature in the area C, is executed by the manipulation of the applied power density as a second step, so that it is possible to promptly execute the switching of the operation mode and achieving the maintenance mode, in highly reliable manner.

As a matter of course, the aforementioned control by the temperature adjuster 13 at the time of the first step, namely, the adjustment of the lifts of the flow-rate adjustment valves 11 and 12, may be executed concurrently with the manipulation of the applied power density while effects of both of these on the electrode tube temperature are being monitored mutually to each other. It should be noted that, this case results out of the moderate control by the first step, so that it is necessary to manipulate the applied power density in consideration of the changes in variety of the characteristics as mentioned above, such as, a delay of increase in the electrode tube temperature due to increase in cooling water temperature, the gas pressure, and the like. However, this case is preferable when the mode switching is to be executed more promptly. Even in this case, in order to stably maintain the electrode tube temperature in the area C, it is better to finely adjust the temperature by manipulating the applied power density.

When the cooperative control with the applied power density is not executed at the time of the mode switching as aforementioned, namely, when the electrode tube temperature is maintained in the area C solely by adjusting the lifts of the flow-rate adjustment valves by the temperature adjuster 13, a moderate change is given as aforementioned, so that the mode switching can be achieved without giving a rapid effect to the discharge load. However, there is a drawback that the time necessary for the mode switching becomes longer, and that, because the lift adjustment of the valves 11,12 corresponds to a relatively rough control, it is difficult to make a stable temperature control in comparison to the control by the applied power density. Further, if the electrode tube temperature falls into a state likely to exceed the upper limit of the temperature in the area C, so that a control for immediately lowering the temperature becomes required, because the action of the effect by the control, namely, the temperature change is moderate, there is a possibility that the temperature exceeds the upper limit of the area C, so that the ozone generating device 3 determines this to be a device failure and is suspended. Thus, in order to achieve the mode switching and the maintenance mode described in this embodiment, the cooperative control of the temperature adjuster 13 and the applied power density to the ozone generating device 3, namely, the power source, is required. In particular, in order to finely adjust and stably maintain the electrode tube temperature in the area C, the control of the applied power density is essential.

In the ozone generating system according to this embodiment, as to the range of the electrode tube temperature in the maintenance mode, the temperature of the cooling water supplied to the ozone generating device 3 and the applied power density are adjusted so that, for example, the electrode tube temperature becomes more than 42° C. when a gas supply pressure (≈the gas pressure P in the discharge space 305) is 0.1 MPaG (≈0.2 MPa), and becomes more then 47.5° C. when the gas supply pressure is 0.2 MPaG (≈0.3 MPa). By operating the ozone generating device 3 in such a condition, it is possible to place $N_2O_5$ that is a discharge product in the ozone generating device 3, into a space having a temperature of its sublimation point or more.

Here, the lower limit of the temperature in the area C will be described using FIG. 5.

FIG. 5 is a vapor pressure curve of $N_2O_5$ in which the abscissa represents a saturated vapor pressure indicated as an absolute pressure, and the ordinate represents a temperature. Namely, assuming that the abscissa represents the gas pressure P in the discharge space 305, when the temperature is increased to more than a temperature corresponding to the pressure, the saturated vapor pressure of $N_2O_5$ becomes more than the surrounding pressure, so that it can be vaporized up to 100%. Here, since the range of the operation pressure of the ozone generating device 3 optimized in this embodiment is from 0.2 to 0.3 MPa (absolute pressure), the sublimation point of $N_2O_5$ under the operation pressure becomes, as is different to that of 32.4° C. under the atmospheric pressure, 42° C. at 0.2 MPa and 47.5° C. at 0.3 MPa.

According to the conventional ozone generating devices, in the maintenance related to the discharge product, in order to suspend the ozone generating device and make it open to the atmosphere pressure, each maintenance temperature is set based on the sublimation point of $N_2O_5$ (32.4°) under the atmospheric pressure. However, in this embodiment in which the maintenance mode is implemented so that $N_2O_5$ is removed during the operation of the ozone generating device 3, it is required to take into consideration the sublimation point (vapor pressure curve) of $N_2O_5$ under the operation pressure, so that it is necessary to set the electrode tube temperature higher than the maintenance temperature of the conventional ozone generating devices. In other words, according to the temperature setting methods of the conventional ozone generating devices, there is included a temperature range where $N_2O_5$ could not be sublimated, whereas according to the temperature range set in the maintenance mode of the ozone generating system according to this embodiment, $N_2O_5$ can be sublimated theoretically at all of the temperatures therein.

Thus, in the ozone generating system according to Embodiment 1, the electrode tube temperature in operation is set to more than 42° C. when the gas supply pressure is 0.1 MPaG, and to more then 47.5° C. when the gas supply pressure is 0.2 MPaG. Namely, the electrode tube temperature is set to a temperature at which the saturated vapor pressure of $N_2O_5$ is more than the gas pressure P in the discharge space 305 in operation. This causes $N_2O_5$ existing in the discharge space 305 to make a phase change from a solid to a gas, so that its staying probability and staying time in the discharge space 305 are reduced drastically.

Further, even when $N_2O_5$ reacts with a small amount of water in the source gas, since the gas is exhausted together with nitric acid thus-produced to the post stage side of the ozone generating device 3, the staying probability and the staying time of nitric acid in the discharge space 305 are reduced drastically. Thus, a possibility of metal corrosion in the ozone generating device 3 in operation becomes reduced significantly. Further, a probability of production of $Fe(NO_3)_3$ to be produced by the reaction of $N_2O_5$ with water is reduced according to the reduction in staying probability and staying time of nitric acid. Here is noted that when the electrode tube temperature is set 50° C. or more, $Fe(NO_3)_3$ is decomposed, resulting in reduction of the presence of hygroscopic $Fe(NO_3)_3$ but in production of nitric acid. However, because the production amount of $Fe(NO_3)_3$ itself has been reduced, the amount of nitric acid produced by the decomposition of $Fe(NO_3)_3$ becomes quite small, and thus it flows away to the post stage side of the ozone generating device 3 in a manner as associated with the gas.

As described above, by the maintenance mode, the temperatures of the electrode tube and the discharge space 305 become a value enough to change the state of the discharge product, so that it becomes possible to physically remove the discharge product in the discharge space 305, and also to reduce drastically the staying probability and the staying time of nitric acid in the ozone generating device 3. Thus, it is unnecessary to suspend the ozone generating system and to make the ozone generating device 3 open to atmosphere, so that the number of the open inspections can be reduced significantly in comparison with the conventional cases. Further, it is also unnecessary to newly add an instrument for maintenance, so that it is possible even for the user side to easily clean up the discharge unit without making the ozone generating device 3 open. Furthermore, the discharge space 305 is prevented beforehand from being choked off, and the metal members and the high-voltage electrode 303 are suppressed from being corroded, so that it is possible to continue highly-efficient ozone generation in a highly reliable manner.

For the conventional open-to-atmosphere maintenance, a lot of time is required, so that the suspended time of the system and the cost for the maintenance have placed a burden on the user. However, according to this embodiment, as aforementioned, the number of the open inspections can be reduced significantly. In particular, the discharge unit can be cleaned up without making it open to atmosphere, and thus, a great effect is provided in that a step for restoring the dew point of the gas in the ozone generating device after the conventional open-to-atmosphere maintenance, becomes unnecessary, to thereby cut out a lot of time required for that step. Further, a consumed amount of the source gas not served for the generation of ozone, but taken for restoring the gas dew point, can also be reduced.

Note that, with respect to the operational control by the maintenance mode, description has been made for the case where the electrode tube temperature (cooling water temperature) and the applied power density are manipulated assuming that the gas pressure P in the discharge space 305 is constant; however, the control is not limited thereto. For example, $N_2O_5$ may be vaporized by decreasing the gas pressure P in the discharge space 305 so as to be lower than the saturated vapor pressure of $N_2O_5$. Instead, the saturated vapor pressure of $N_2O_5$ may be made to be higher than the gas pressure in the discharge space 305 by manipulating the gas pressure in combination with the electrode tube temperature and the applied power density.

In general, at a discharge load, when the gas pressure is decreased during its operation, the discharging state changes, causing in some cases an adverse effect on the discharge unit. In the ozone generating system according to this embodiment, when the gas pressure P is decreased in the maintenance mode, because of a reduction in impedance, it becomes more likely to cause an electric discharge in the ozone generating device 3, so that for some situations, there is concern over an occurrence of abnormal discharge or an enlargement of power. However, in the ranges of the gap length d and the gas pressure P set in the ozone generating device 3 used in the ozone generating system according to this embodiment, an amount of voltage change required for keeping discharge is at most about 1.5 kV. This degree of the amount of change never interferes with stability of the discharge required for the generation of ozone.

Meanwhile, when the voltage applied to the ozone generating device 3 is constant (about 10 kV), there is a possibility that a voltage applied to the dielectric member other than the discharge space is increased by about 1.5 kV according to a decrease in the gas pressure P; however, in the insulation design of the dielectric member, it is designed to withstand a voltage of 1.5 times the working voltage, and thus it is extremely unlikely that an abnormal discharge or a breakage occurs. Further, said differently, it becomes possible to apply predetermined power to the ozone generating device 3 with a voltage that is lower than that before the decrease in the gas pressure, so that the applied power is increased when the applied voltage is constant. Since an increase in the applied power is equivalent to an increase in the electrode tube temperature, although depending on a manipulation amount of the gas pressure P, an effect of increasing the electrode tube temperature emerges in addition to the effect by the manipulation of the gas pressure, thus causing $N_2O_5$ to be more likely to vaporize. In the maintenance mode described in this embodiment, since the electrode tube temperature is controlled on the basis of FIG. 4 (to fall within the area C shown in the figure), there is nothing that the ozone generating device 3 is operated in a temperature range where the electrode tube, for example, is damaged.

As described above, by making a change in the gas pressure P, the vaporization of $N_2O_5$ can be promoted. Although the change in the gas pressure P is not at the level of impairing the stability of discharge, a prompt change in the operational condition should have to be avoided as much as possible. In that event, by executing a cooperative control of the temperature adjuster 13 and the gas pressure P, that is, the gas supplying device 1, it is possible to make the saturated vapor pressure of $N_2O_5$ higher than the gas pressure in the discharge space 305. On this occasion, since a decreasing amount of the gas pressure can be made smaller, the effect on the discharge becomes extremely small.

At the time of the mode switching, in order to increase the electrode tube temperature, the temperature adjuster 13 executes the lift adjustment of the flow-rate adjustment valves 11 and 12, to thereby change the electrode tube temperature in the direction to be maintained in the area C. This operation is referred to as a first step. The operation of the first step provides a moderate change, so that it gives a small effect to the discharge load and is thus well-suited for controlling the load. Accordingly, it is no problem to apply a relatively rough control thereto. After the operation of the first step or while continuing this operation, the gas pressure P is decreased. This is referred to as a second step. The decrease in the gas pressure P can be easily achieved by decreasing the discharge pressure of the gas supplying device 1 (reducing the amount of gas supply), or by making larger the lift of an ozonized-gas outlet side valve of the ozone generating device 3. In such a way, in association with the increase in the cooling water temperature, the electrode tube temperature is increased, so that the saturated vapor pressure of $N_2O_5$ is increased. In addition, by decreasing the gas pressure P, it is possible to make the saturated vapor pressure of $N_2O_5$ higher than the gas pressure in the discharge space 305. When, before the manipulation of the gas pressure P, the saturated vapor pressure of $N_2O_5$ is increased by increasing the electrode tube temperature, the decrease (change amount) in the gas pressure P can be made smaller than in the case of solely manipulating the gas pressure P.

As a matter of course, the aforementioned control by the temperature adjuster 13 at the time of the first step, namely, the adjustment of the lifts of the flow-rate adjustment valves 11 and 12, may be executed concurrently with the manipulation of the gas pressure P while effects of both of these on the saturated vapor pressure of $N_2O_5$ are being monitored mutually to each other. It should be noted that, this case results out of the moderate control by the first step, so that it is necessary to manipulate the gas pressure P in consideration of a delay of increase in the electrode tube temperature due to increase in cooling water temperature. This case is preferable when the mode switching is to be executed more promptly.

An increase in the cooling water temperature by the temperature adjuster 13 is a relatively moderate phenomenon, whereas a change in the gas pressure P is a rapid phenomenon. Thus, when a cooperative control by the temperature adjuster 13 and the gas supplying device 1 is used, a prompt mode switching can be achieved in comparison to solely manipulating the cooling water temperature. Further, likewise, by adding the manipulation of the applied power density to the cooperative control by the temperature adjuster 13 and the gas supplying device 1, it is possible to achieve a more highly-accurate and stable mode switching and maintenance mode. In particular, in order to maintain the electrode tube temperature in the area C and to achieve its stability, it is preferable to finely adjust the applied power density.

As shown in FIG. 3, the maintenance mode is ended at the stage where the control unit 4 determined that the abnormality was eliminated (Step S40 "Y") on the basis of data of the dew point or the differential pressure output from the dew-point measuring unit 2 or the differential-pressure measuring unit 6, so that the ozone generating device 3 is, while being in operation, returned automatically to the normal operation mode. That is, the applied power density and the temperature of the cooling water supplied to the ozone generating device 3 are returned automatically to the initial operational condition to thereby continue such a proper operation.

It should be noted that, in the maintenance mode, since the electrode tube temperature and the average temperature of the discharge space 305 change in the direction to become higher than in the normal operation mode, the ozone generation efficiency of the ozone generating device 3 is reduced. Namely, when the supply amount of the source gas is kept constant, a concentration of ozone being output becomes reduced. In the case where the ozone utilization facility 200 that utilizes the ozone generating system according to this embodiment does not accept a temporal reduction in ozone concentration in the maintenance mode, it is better to feed, at least until the ozone concentration is restored, the output ozonized gas directly to the ozone removal treatment unit 5 as previously described, and to supply, after the operation returned automatically to the normal operation mode, the ozonized gas to the ozone utilization facility 200.

Further, in the maintenance mode, when it is necessary to maintain the ozone generation amount comparable to that in the normal operation mode, such an ozone generation amount can be ensured by increasing the supply amount of source gas even though the ozone concentration is reduced. In contrast, when it is necessary to maintain the ozone concentration, such an ozone concentration can be ensured by decreasing the supply amount of source gas even though the ozone generation amount is decreased. When any of these states is accepted, it is possible to continuously supply the ozonized gas to the ozone utilization facility 200.

As described above, the ozone generating system according to Embodiment 1 of the invention comprises: the discharge electrodes (discharge electrode unit) 30 that are arranged opposite to each other to thereby form a discharge space 305 for generating ozone; the gas supplying device 1 that supplies pressurized air as a source gas for generating ozone to the discharge space 305; the unshown power source device in the ozone generating device 3, that supplies power for discharging to the discharge electrodes (discharge electrode unit 30); the cooling system (temperature adjustment device 7) that functions as a temperature control device for adjusting a temperature of the discharge electrodes (discharge electrode unit 30); the control unit 4 that controls the gas supplying device 1, the power source device and the temperature adjustment device 7 in their cooperative manner, to thereby control generation of ozone in the discharge space 305; and the dew-point measuring unit 2 and the differential-pressure measuring unit 6 that function as a measurement unit for measuring at least one of a dew point of the source gas supplied to the discharge space 305 and a pressure loss of the source gas in the discharge space 305, wherein, during the generation of ozone in the discharge space 305, the control unit 4 determines whether or not there is an abnormality in the discharge space 305 or its sign on the basis of at least one of values of the dew point and the pressure loss output from the dew-point measuring unit 2 and the differential-pressure measuring unit 6, and if determined there is an abnormality in the discharge space 305 or its sign, the control unit, in a state where the generation of ozone is continued in the discharge space 305, increases the temperature of the discharge electrodes (discharge electrode unit 30) so that the saturated vapor pressure of dinitrogen pentoxide ($N_2O_5$) corresponding to the temperature of the discharge electrodes (discharge electrode unit 30) becomes higher than the gas pressure P in the discharge space 305; namely, the control unit is configured so that it can execute the maintenance mode.

Thus, it is possible to adequately determine about the abnormality or its sign due to the accumulation of solid dinitrogen pentoxide in the discharge space 305. When the abnormality or its sign is found through such a determination, $N_2O_5$ can be vaporized in a state of continuing the operation (ozone generation) to thereby eliminate the abnormal state. This makes it possible to maintain a stable operating state without interrupting generation of ozone, to thereby achieve a highly-reliable ozone generating system.

Namely, without suspending the discharge of the ozone generating device 3 and also without making the ozone generating device 3 open to atmosphere, it is possible to remove the discharge product accumulated in the discharge space 305 and adhered to the discharge electrodes (discharge electrode unit 30). Thus, an effort, a cost and a time for the periodic maintenance that has been recommended by the makers can be reduced significantly, and the production of nitric acid in association with the open-to-atmosphere operation is suppressed. This significantly enhances the reliability of the device.

In particular, when the control unit 4 is configured to control the density of applied power applied to the discharge space 305, the temperature of the cooling water flowing through the discharge electrodes (discharge electrode unit 30), and the gas pressure P in the discharge space 305 so as to increase the temperature of the discharge electrodes (discharge electrode unit 30), it is possible to achieve a more highly-accurate and stable mode switching and maintenance mode.

In another respect, when the control unit 4 is configured to decrease the gas pressure P in the discharge space 305 up to a predetermined pressure exceeding the atmospheric pressure so that the saturated vapor pressure of dinitrogen pentoxide corresponding to the temperature of the discharge electrodes (discharge electrode unit 30), becomes higher than the gas pressure P in the discharge space 305, it is possible to vaporize $N_2O_5$ to thereby eliminate the abnormal state, even if the temperature is not largely changed. In still another respect, because the gas pressure P can be promptly changed, an effect of removing $N_2O_5$ emerges earlier than the effect by the increase in the temperature.

In particular, when the gas pressure P in the discharge space 305 is set to 0.1 MPa or more but less than 0.2 MPa as a gauge pressure, it is unable to vaporize at about 40° C. in some cases; however, by increasing the temperature to in a range from 42° C. to 47.5° C. according to the gas pressure P, the ozone generation efficiency is enhanced, and an effect of vaporizing $N_2O_5$ emerges remarkably.

In particular, the space length d that is an interval between the discharge electrodes (discharge electrode unit 30) is 0.3 mm or more but 0.6 mm or less, the ozone generation efficiency is enhanced and the above effect emerges in a particularly remarkable fashion.

Meanwhile, the discharge electrode unit 30 is configured (with the grounding electrode 301 and a tank as a casing of the ozone generating device 3) to allow the cooling water for removing heat generated in the discharge electrode unit 30 to flow therethrough. The temperature adjustment device is the cooling system (temperature adjustment device 7) that includes the circulation pump 9 for supplying and circulating the cooling water to the ozone generating device 3 and the cooler 8 for cooling the cooling water due to absorption of heat. Further, in the temperature adjustment device, there are provided the main piping through which the cooling water going out from the discharge electrodes (discharge electrode unit 30) (or from the ozone generating device 3 provided therewith) passes through the cooler 8 and is then returned to the ozone generating device 3, and the bypass piping 10 through which the cooling water is returned to the ozone generating device 3 without passing through the cooler 8, so that the temperature of the cooling water supplied to the ozone generating device 3 is increased by enlarging the rate of the cooling water caused to flow through the bypass piping 10. Namely, it is configured so that, by reducing the absorption amount of heat by the cooler 8 from the cooling water, the water temperature of the cooling water is increased, to thereby increase the temperature of the discharge electrode unit 30. Thus, extra energy such as by heating is not necessary. Notwithstanding, it is possible to maintain a stable operating state without interrupting generation of ozone, to thereby achieve a highly-reliable ozone generating system.

Further, as described above, the ozone generation method according to Embodiment 1 of the invention is an ozone generation method in which pressurized air is supplied as a source gas to the discharge space 305 formed by the discharge electrode unit 30 that is mutually opposite electrodes with the interval d therebetween, and a discharge is caused in the discharge space to thereby generate ozone, said ozone generation method comprising:

measuring at least one of the dew point of the source gas supplied to the discharge space 305 and the pressure loss of the source gas at the discharge space 305, during the normal operation mode in which ozone is being generated (Step S10);

determining whether or not there is an abnormality or its sign in the discharge space 305 on the basis of at least one of the measured dew point and pressure loss (Step 20); and, when it is determined that there is an abnormality or its sign in the discharge space 305 (Step S20, "Y"), switching the mode to the maintenance mode (Step S30) in which the temperature of the discharge electrode unit 30, in a state of continuing generation of ozone, is increased so that the saturated vapor pressure of dinitrogen pentoxide corresponding to the electrode tube temperature that is a temperature of the discharge electrode unit 30, becomes higher than the gas pressure P in the discharge space 305.

Thus, it is possible to adequately determine about the abnormality or its sign due to the accumulation of solid dinitrogen pentoxide in the discharge space 305. When the abnormality or its sign is found through such a determination, $N_2O_5$ can be vaporized in a state of continuing the operation (ozone generation) to thereby eliminate the abnormal state. This makes it possible to maintain a stable operating state without interrupting generation of ozone, to thereby achieve a highly-reliable ozone generation method.

Embodiment 2

Figure 6:
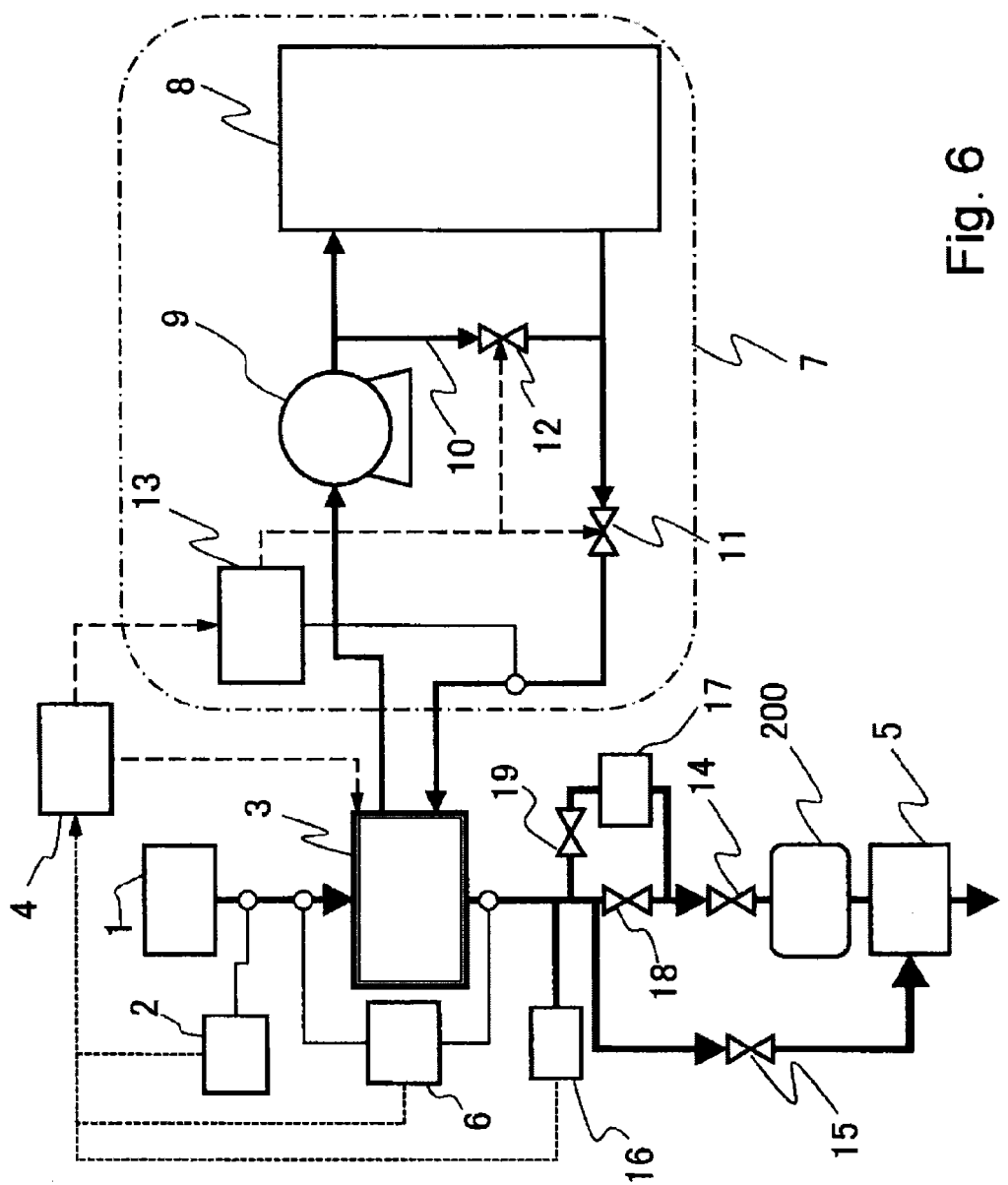
FIG. 6 is a systematic diagram showing a configuration of an ozone generating system according to Embodiment 2 of the invention.

An ozone generating system according to Embodiment 2 of the invention will be described. Although the ozone generating system according to Embodiment 2 is similar in basic configuration and operation to Embodiment 1, what is characteristic is that a nitric-acid concentration measuring unit and a nitric-acid trap are incorporated between the ozone generating device and the ozone utilization facility. FIG. 6 is a systematic diagram showing an instrumental configuration, a control system, a flow system and the like, of the ozone generating system according to Embodiment 2. In the figure, the same reference numerals are given for the parts similar to or corresponding to the components of the ozone generating system according to Embodiment 1, so that description thereof is omitted unless otherwise necessary.

As shown in FIG. 6, in the ozone generating system according to Embodiment 2, there are provided a nitric-acid concentration measuring unit 16 and a nitric-acid trap 17 that are placed in between the ozone generating device 3 and the ozone utilization facility 200 (exactly, the valve 14) where the post stage of the gas flow system is formed, and a valve 18 and a valve 19 that control a gas flow to the nitric-acid trap 17. In the normal operation mode, the nitric-acid concentration measuring unit 16 executes a state monitoring as similar to the dew-point measuring unit 2 and the differential-pressure measuring unit 6, to measure a concentration of nitric acid included in the ozonized gas, thereby outputting a signal to the control unit 4. Here, assuming that a first threshold value is defined as two times a nitric acid concentration in a proper operation, even when the signal output from the nitric-acid concentration measuring unit 16 indicates that the concentration reaches the first threshold value, the control unit 4 determines that there is an abnormality or its sign, to thereby cause switching to the maintenance mode, in a similar manner described for Step S20 in FIG. 3 according to Embodiment 1. Then, for the maintenance mode, the control unit instructs the temperature adjuster 13 to increase the cooling water temperature up to a predetermined value or more, as described in Embodiment 1.

Meanwhile, in Embodiment 2, when the nitric-acid concentration output from the nitric-acid concentration measuring unit 16 becomes more than a second threshold value that is higher than the first value in the maintenance mode, the control unit further controls so that the gas output from the ozone generating device 3 is fed to either one or both of the nitric-acid trap 17 and the ozone removal treatment unit 5.

The presence/absence of an abnormality or its sign is determined taking also into consideration the data of the nitric acid concentration output from the nitric-acid concentration measuring unit 16, in addition to the data of the dew point or the differential pressure output from the dew-point measuring unit 2 or the differential-pressure measuring unit 6. Thus, the maintenance mode is ended at the stage where, on the basis of the data of the nitric acid concentration in addition to the data of the dew point or the differential pressure, it is determined that the abnormality was eliminated (corresponding to Step S40 in Embodiment 1), and then the ozone generating device 3 is, while being in operation, returned automatically to the normal operation mode. That is, the applied power density and the temperature of the cooling water supplied to the ozone generating device 3 are returned automatically to the initial operational condition to thereby continue such a proper operation.

Here, for example, when the nitric acid concentration is less than the second threshold value, it is possible by manipulating the valves 18 and 19 (valve 18: open, valve 19: closed), to feed the gas to either one or both of the ozone utilization facility 200 through the valve 14 without passing through the nitric-acid trap 17 and the ozone removal treatment unit 5 through the valve 15. Further, the supply destination may be automatically determined by the control unit 4 in such a manner that it outputs ON/OFF commands for the valve 14 and the valve 15 according to the output from the nitric-acid concentration measuring unit 16.

As the nitric-acid trap 17, a gas cleaning device using water may be applied, for example. By the nitric-acid trap 17, an adhered amount of nitric acid to the metal pipings downstream of the ozone generating device 3 can be controlled, so that corrosion of the metal pipings by nitric acid can be reduced. Further, since the introduction of nitric acid into the ozone removal treatment unit 5 is reduced, it is achievable to prolong the duration of the ozone removal treatment unit.

Meanwhile, in this embodiment, there is placed the nitric-acid concentration measuring unit 16, and the nitric acid concentration is selected as a requirement for switching to the maintenance mode; however, a NOx concentration may be selected as the requirement for switching by replacing the nitric-acid concentration measuring unit 16 with a NOx-concentration measuring unit.

As described above, the ozone generating system according to Embodiment 2 of the invention is, similarly to Embodiment 1, provided with a configuration capable of executing the maintenance mode, and further includes the nitric-acid concentration measuring unit 16 that measures a nitric acid concentration in the ozonized gas output from the ozone generating device 3 (exactly, discharge space 305) or the unshown NOx-concentration measuring unit that measures a NOx concentration in the gas; wherein with the above unit, the nitric-acid trap 17 that is a nitric acid removing unit for removing a nitric-acid component in the ozonized gas is provided downstream of the ozone generating device 3; and wherein, when the value of the nitric acid concentration output from the nitric-acid concentration measuring unit 16 or the NOx concentration output from the NOx-concentration measuring unit is higher than a first value, the control unit 4 determines that there is an abnormality or its sign in the ozone generating device 3, and further when the value of the nitric acid concentration or the value of the NOx concentration is higher than a second value that is higher than the first value, the control unit controls so that at least a part of the ozonized gas is passed through the nitric-acid removing unit (nitric-acid trap 17) according to that concentration.

Thus, similarly to Embodiment 1, it is possible to remove the discharge product accumulated in the discharge space 305 and adhered to the discharge electrode unit 30, without suspending the discharge of the ozone generating device 3 and also without making the ozone generating device 3 open to atmosphere. Therefore, an effort, a cost and a time for the periodic maintenance that has been recommended by the makers can be reduced significantly, and the reliability of the device can be enhanced significantly.

Further, as a feature of Embodiment 2, there are provided the nitric-acid concentration measuring unit 16 that measures a concentration of nitric acid discharged from the ozone generating device 3 and the nitric-acid trap 17 as a nitric-acid removing unit that traps nitric acid. Thus, in the normal operation, it is possible to utilize the nitric acid concentration as a requirement for switching to the maintenance mode, in addition to the gas dew point and the differential pressure. Besides, in the maintenance mode, it is possible to select whether to use the nitric-acid trap and which destination the ozonized gas is to be supplied, according to the measured nitric acid concentration. Thus, even when an ozonized gas whose composition is different to that in the normal operation mode, is not allowed to be used in the treatment process, it can be treated directly at the ozone removal treatment unit 5, so that it is not at all necessary to suspend the ozone generating device 3.

Embodiment 3

Figure 7:
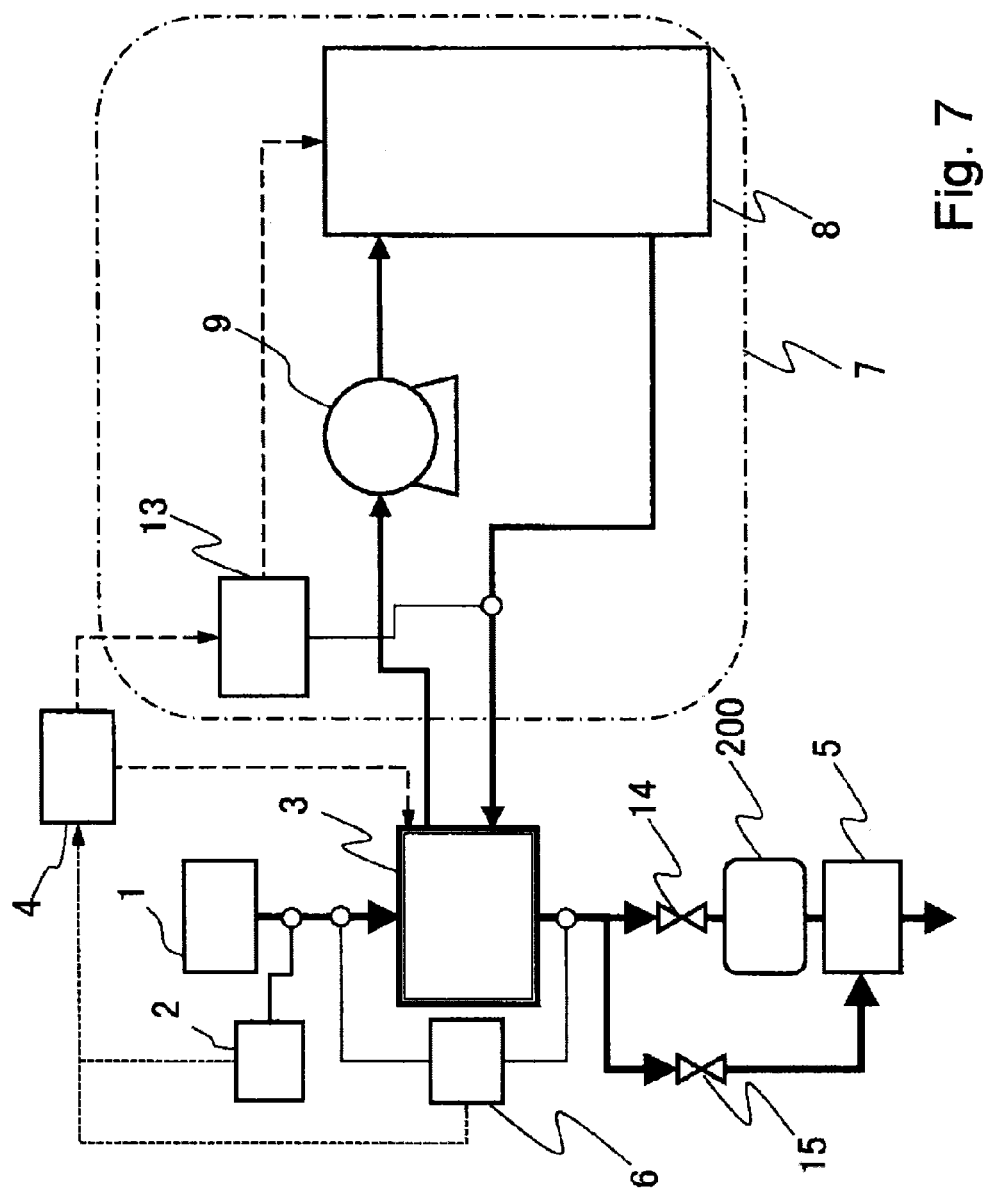
FIG. 7 is a systematic diagram showing a configuration of an ozone generating system according to Embodiment 3 of the invention.

An ozone generating system according to Embodiment 3 of the invention will be described. Although the ozone generating system according to Embodiment 3 is similar in basic configuration and operation to Embodiment 1, what is characteristic is that, in the cooling system, instead of placing the bypass piping, the operation of the cooler is made controllable. FIG. 7 is a systematic diagram showing an instrumental configuration, a control system, a flow system and the like, of the ozone generating system according to Embodiment 3. In the figure, the same reference numerals are given for the parts similar to or corresponding to the configuration instruments of the ozone generating system according to Embodiment 1, so that description thereof is omitted unless otherwise necessary.

As shown in FIG. 7, in the ozone generating system according to Embodiment 3, there are provided in the cooling system (temperature adjustment device 7): a circulation pump 9 for circulating the cooling water for cooling the ozone generating device 3; a cooler 8 for cooling the cooling water increased in temperature due to absorption of heat generated in the ozone generating device 3; and a temperature adjuster 13 for adjusting the temperature of the water to be supplied to the ozone generating device 3.

Further, the ozone generating device 3, the circulation pump 9 and the cooler 8 are connected by the pipings indicated by thick lines in the figure in a looped form, to thereby constitute a cooling line that circulates through between the ozone generating device 3, the circulation pump 9 and the cooler 8. On the other hand, the cooling (heat-exchanging) function of the cooler 8 is made controllable (enable/disable) by command of the temperature adjuster 13, so that the water temperature of the cooling water to be output from the cooler 8 can be adjusted.

Even in Embodiment 3, similarly to Embodiment 1, there are set two operation modes of (1) the normal operation mode and (2) the maintenance mode, thereby providing such a feature that when the control unit 4 detects an abnormality or its sign, a switching between these modes is made in a state where the discharge of the ozone generating device 3 is continued without change. That is, the production of nitric acid and the accumulation of the discharge product in the ozone generating device 3 during operation in the normal operation mode, are detected by use of the source-gas dew point or the differential pressure of the ozone generating device 3, and when an abnormality is determined, the operation can be switched to the maintenance mode in a state where the discharge (ozone generation) is continued without change.

When a signal indicative of the data that causes the control unit 4 to determine that a sign of abnormality emerges, is sent from at least one of the dew-point measuring unit 2 and the differential-pressure measuring unit 6 and thus the operation is switched to the maintenance mode, the temperature adjuster 13 suspends the cooling (heat-exchanging) function of the cooler 8. As a result, the temperature of the cooling water flowing through the cooling system (temperature adjustment device 7) is increased due to the thermal energy based on the shaft power of the circulation pump 9 and the heat generated by the ozone generating device 3, so that the temperatures of the electrode tube and the discharge space 305 in the ozone generating device 3 can be increased until they come into the temperature range shown in Embodiment 1. Thereafter, by appropriately controlling ON/OFF of the function of the cooler 8, the temperature of the cooling water can be controlled into an intended range. Further, concurrently with the control of the cooling function, in the cooler 8, by reducing its discharging rate of flow to the ozone generating device 3, the speed of temperature rise in the cooling water can also be enhanced.

Namely, also in the ozone generating system according to Embodiment 3, the electrode tube temperature can be set to a temperature at which the saturated vapor pressure of $N_2O_5$ becomes more than the gas pressure P in the discharge space 305 in operation. This causes $N_2O_5$ existing in the discharge space 305 to make a phase change from a solid to a gas, so that the discharge product is suppressed from adhering in the discharge space 305 and to the electrode unit. Thus, with this mode, it is possible to execute the maintenance of the electrode unit without suspending the ozone generation and also without making the ozone generating device open to atmosphere.

In a similar manner described using FIG. 3 in Embodiment 1, the maintenance mode is ended at the stage where the control unit 4 determined that the abnormality was eliminated (Step S40 "Y") on the basis of data of the dew point or the differential pressure output from the dew-point measuring unit 2 or the differential-pressure measuring unit 6, so that the ozone generating device 3 is, while being in operation, returned automatically to the normal operation mode. That is, the applied power density and the temperature of the cooling water supplied to the ozone generating device 3 are returned automatically to the initial operational condition to thereby continue such a proper operation.

Meanwhile, here is described that the cooling water temperature is controlled by controlling (enable/disable) the cooling (heat-exchanging) function of the cooler 8; however, when the cooler 8 is a chiller, it is allowed that the heat-exchanging function is maintained and instead, the setup temperature of the circulation water (cooling water supplied to the ozone generating device 3) is increased upon receiving a signal from the control unit 4.

It is further allowed that, as to a heat-transfer medium (water, air, etc.) in the primary side (not shown) of the cooler 8, its circulation flow rate in the primary side is controlled to suppress the heat-exchanging function, so as to control the temperature of the secondary side (cooling water for the ozone generating device 3). This control is realized by providing in the heat-transfer medium circuit of the primary-side, a flow-rate adjustment valve or bypass circuit operable upon receiving a signal from the control unit 4.

As described above, according to the ozone generating system according to Embodiment 3, the discharge electrodes (discharge electrode unit 30) is configured (with the grounding electrode 301 and a tank as a casing of the ozone generating device 3) to allow the cooling water for removing heat generated in the discharge electrode unit 30 to flow therethrough; the temperature adjustment device is the cooling system (temperature adjustment device 7) that includes the circulation pump 9 for supplying and circulating the cooling water to the ozone generating device 3, and the cooler 8 for cooling the cooling water due to absorption of heat; and further, the cooling function of the cooler 8 itself is made adjustable, so that the water temperature of the cooling water is increased by reducing the cooling capability of the cooler 8. Namely, it is configured so that, by changing the capability of the cooler 8 itself to reduce its absorption amount of heat from the cooling water, the water temperature of the cooling water is increased to thereby increase the temperature of the discharge electrode unit 30. Thus, extra energy such as by heating is not necessary. Notwithstanding, it is possible to maintain a stable operating state without interrupting generation of ozone, to thereby achieve a highly-reliable ozone generating system. Further, since any pipe-line switching for the cooling water, such as between a main line and a bypass line, is unnecessary, a change is moderate with respect to the cooling water amount and the water temperature, so that the switching between the maintenance mode and the normal operation mode can be executed smoothly.

Thus, similarly to Embodiment 1, it is possible to remove the discharge product accumulated in the discharge space 305 and adhered to the discharge electrode unit 30, without suspending the discharge of the ozone generating device 3 and also without making the ozone generating device 3 open to atmosphere. Therefore, an effort, a cost and a time for the periodic maintenance that has been recommended by the makers can be reduced significantly, and the production of nitric acid in association with the open-to-atmosphere operation is suppressed. This significantly enhances the reliability of the device.

Embodiment 4

An ozone generating system according to Embodiment 4 of the invention will be described. The ozone generating system according to Embodiment 4 corresponds to a combination of the gas flow system in the ozone generating system according to Embodiment 2 and the cooling system in the ozone generating system according to Embodiment 3. The basic configuration and operation other than the above, is similar to in Embodiments 1 to 3.

Figure 8:
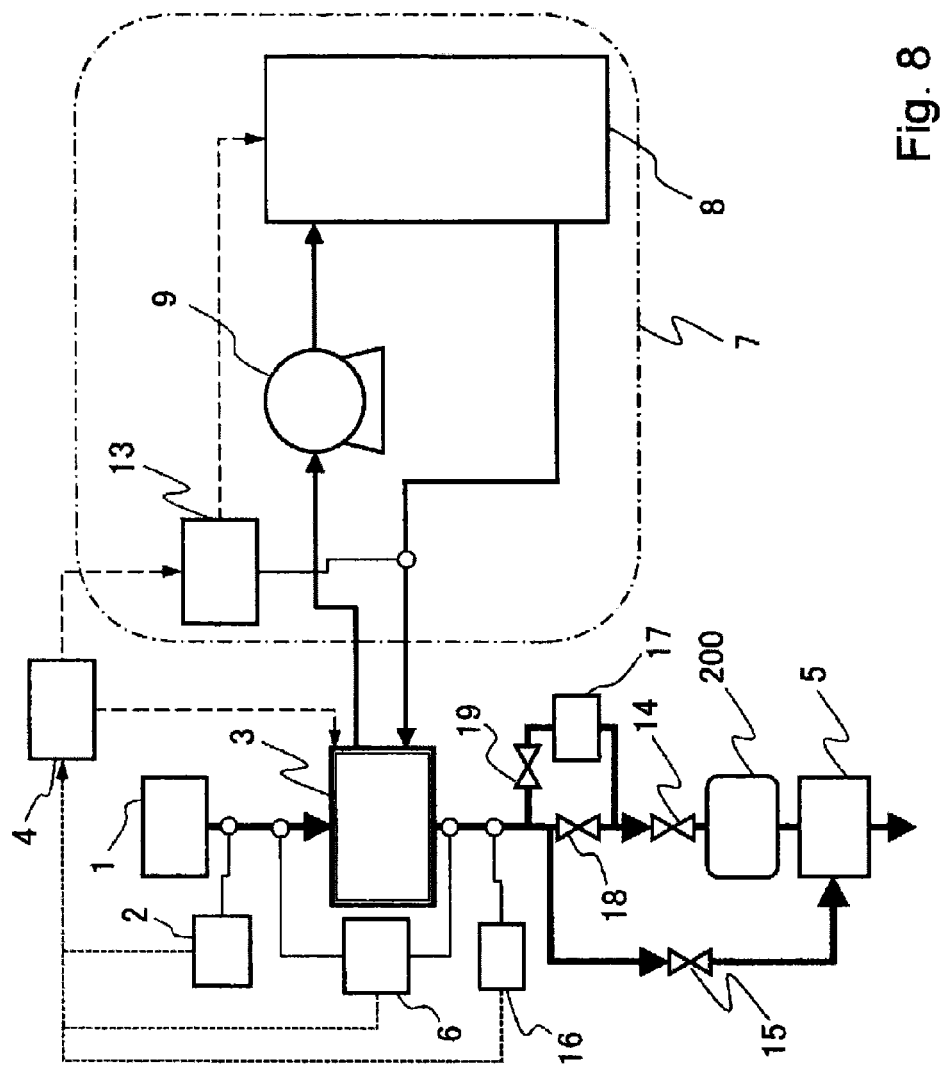
FIG. 8 is a systematic diagram showing a configuration of an ozone generating system according to Embodiment 4 of the invention.

FIG. 8 is a systematic diagram showing an instrumental configuration, a control system, a flow system and the like, of the ozone generating system according to Embodiment 4. In the figure, the same reference numerals are given for the parts similar to or corresponding to the configuration instruments of the ozone generating systems according to Embodiments 1 to 3, so that description thereof is omitted unless otherwise necessary. As shown in FIG. 8, in the ozone generating system according to Embodiment 4, there are provided a nitric-acid concentration measuring unit 16 and a nitric-acid trap 17 that are placed between the ozone generating device 3 and the ozone utilization facility 200, and a valve 18 and a valve 19 that control the gas flow to the nitric-acid trap.

Further, in the cooling system (temperature adjustment device 7), there are provided a circulation pump 9 for circulating the cooling water for cooling the ozone generating device 3, a cooler 8 for cooling the cooling water increased in temperature due to absorption of heat generated in the ozone generating device 3, and a temperature adjuster 13 for adjusting the temperature of the water to be supplied to the ozone generating device 3; wherein the cooling (heat-exchanging) function of the cooler 8 is made controllable (enable/disable) by command of the temperature adjuster 13.

As described above, according to the ozone generating system according to Embodiment 4, since the maintenance mode similar to in Embodiments 1 to 3 is set therein, it is possible to remove the discharge product accumulated in the discharge space 305 and adhered to the discharge electrode unit 30, without suspending the discharge of the ozone generating device 3 and also without making the ozone generating device 3 open to atmosphere. Therefore, an effort, a cost and a time for the periodic maintenance that has been recommended by the makers can be reduced significantly, and the production of nitric acid in association with the open-to-atmosphere operation is suppressed. Thus, the reliability of the device against corrosion can be enhanced significantly.

Furthermore, similarly to Embodiment 2, there are provided the nitric-acid concentration measuring unit 16 that measures a concentration of nitric acid discharged from the ozone generating device 3 and the nitric-acid removing unit (nitric-acid trap 17) that traps nitric acid. Thus, in the normal operation, it is possible to utilize the nitric acid concentration as a requirement for switching to the maintenance mode, in addition to the gas dew point and the differential pressure. Besides, in the maintenance mode, it is possible to select whether to use the nitric-acid trap 17 and which destination the ozonized gas is to be supplied, according to the measured nitric acid concentration. Thus, even when an ozonized gas whose composition is different to that in the normal operation mode, is not allowed to be used in the treatment process, it can be treated directly at the ozone removal treatment unit 5, so that it is not at all necessary to suspend the ozone generating device 3.

Embodiment 5

An ozone generating system according to Embodiment 5 of the invention will be described. As compared to the ozone generating system according to Embodiment 3, what is characteristic in the ozone generating system according to Embodiment 5 is that a heat exchanger, which executes heat exchange of the exhaust heat of the power source device for activating the ozone generating device with the cooling water, is placed in the cooling system. The basic configuration and operation other than the above, is similar to those described in respective Embodiments 1 to 4.

Figure 9:
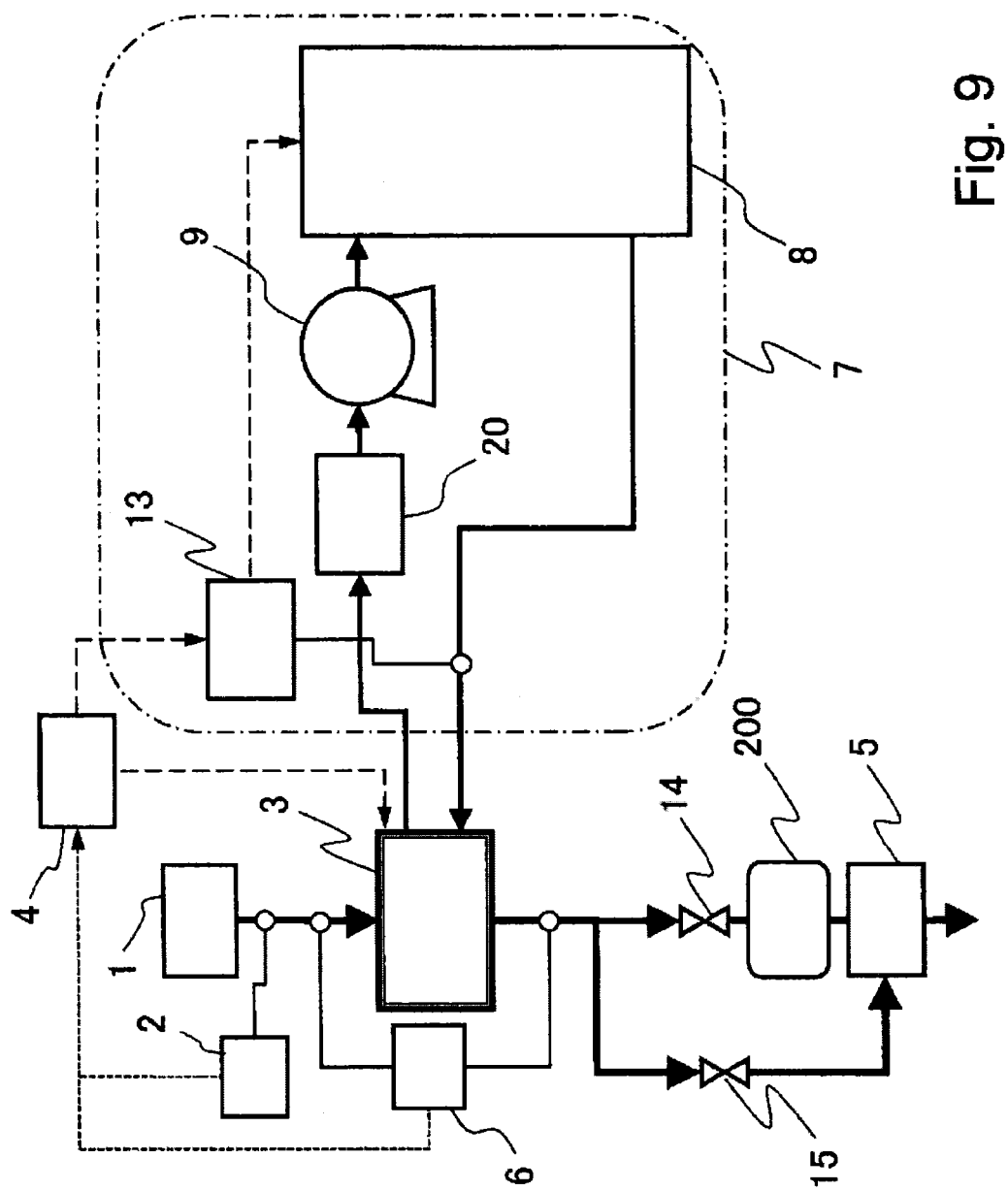
FIG. 9 is a systematic diagram showing a configuration of an ozone generating system according to Embodiment 5 of the invention.

FIG. 9 is a systematic diagram showing an instrumental configuration, a control system, a flow system and the like, of the ozone generating system according to Embodiment 5. In the figure, the same reference numerals are given for the parts similar to or corresponding to the configuration instruments of the ozone generating systems according to Embodiments 1 to 4, so that description thereof is omitted unless otherwise necessary. As shown in FIG. 9, in the ozone generating system according to Embodiment 5, the cooling system (temperature adjustment device 7) is provided with a heat exchanger 20 that is placed between the ozone generating device 3 and the circulation pump 9, and that executes heat exchange of the exhaust heat of the power source device for activating the ozone generating device 3 with the cooling water.

Further, the ozone generating device 3, the heat exchanger 20, the circulation pump 9 and the cooler 8 are connected by the pipings indicated by thick lines in the figure in a looped form, to thereby constitute a cooling line that circulates through between the ozone generating device 3, the heat exchanger 20, the circulation pump 9 and the cooler 8. This makes it possible not only to adjust the water temperature of the cooling water output from the cooler 8, but also to increase the speed of temperature rise of the water by use of heat provided from the heat exchanger 20.

Even in Embodiment 5, similarly to Embodiment 1, there are set two operation modes of (1) the normal operation mode and (2) the maintenance mode, thereby providing such a feature that when the control unit 4 detects an abnormality or its sign, a switching between these modes is made in a state where the discharge of the ozone generating device 3 is continued without change. That is, the production of nitric acid and the accumulation of the discharge product in the ozone generating device 3 during operation in the normal operation mode, are detected by use of the source-gas dew point and the differential pressure of the ozone generating device 3, and when an abnormality is determined, the operation can be switched to the maintenance mode in a state where the discharge is continued without change.

When a signal indicative of the data that causes the control unit 4 to determine that a sign of abnormality emerges, is sent from at least one of the dew-point measuring unit 2 and the differential-pressure measuring unit 6 and thus the operation is switched to the maintenance mode, the temperature adjuster 13 suspends the cooling (heat-exchanging) function of the cooler 8. As a result, the temperature of the cooling water flowing through the cooling system (temperature adjustment device 7) is increased not only due to the thermal energy based on the shaft power of the circulation pump 9, but also due to the exhaust heat of the power source instrument through the heat exchanger 20 and the heat generated by the ozone generating device 3, and thus it is increased faster than in the case of Embodiment 3. This makes it possible to shorten the time until the temperatures of the electrode tube and the discharge space 305 in the ozone generating device 3 come into a predetermined temperature range.

Namely, also in the ozone generating system according to Embodiment 5, the electrode tube temperature can be set to a temperature at which the saturated vapor pressure of $N_2O_5$ becomes more than the gas pressure P in the discharge space 305 in operation. Further, by use of heat from the heat exchanger 20, it is possible to easily and quickly increase the temperature up to a preferred temperature. This causes $N_2O_5$ existing in the discharge space 305 to promptly make a phase change from a solid to a gas, so that the discharge product is suppressed from adhering in the discharge space 305 and to the electrode unit. Thus, with this mode, it is possible to execute the maintenance of the electrode unit without suspending the ozone generation and also without making the ozone generating device open to atmosphere.

Similarly to Embodiment 3, the maintenance mode is ended at the stage where the control unit 4 determined that the abnormality was eliminated (Step S40 "Y") on the basis of data of the dew point or the differential pressure output from the dew-point measuring unit 2 or the differential-pressure measuring unit 6, so that the ozone generating device 3 is, while being in operation, returned automatically to the normal operation mode. That is, the applied power density and the temperature of the cooling water supplied to the ozone generating device 3 are returned automatically to the initial operational condition to thereby continue such a proper operation.

As described above, in the ozone generating system according to Embodiment 5, the discharge electrode unit 30 is configured (with the grounding electrode 301 and a tank as a casing of the ozone generating device 3) to allow the cooling water for removing heat generated in the discharge electrode unit 30 to flow therethrough. And the temperature adjustment device is the cooling system (temperature adjustment device 7) that includes: the circulation pump 9 for supplying and circulating the cooling water to the ozone generating device 3; the cooler 8 for cooling the cooling water due to absorption of heat; and further, the heat exchanger 20 that heats up the cooling water by the exhaust heat from the power source for causing the discharge in the discharge space 305, so that extra energy such as by heating is not necessary. Thus, it is possible to increase the water temperature of the cooling water more quickly than the ozone generating systems in Embodiments 1 to 4.

Embodiment 6

An ozone generating system according to Embodiment 6 of the invention will be described. The ozone generating system according to Embodiment 6 corresponds to a combination of the gas flow system in the ozone generating system according to Embodiment 2 and the cooling system in the ozone generating system according to Embodiment 5. The basic configuration and operation other than the above, is similar to in Embodiments 1 to 5.

Figure 10:
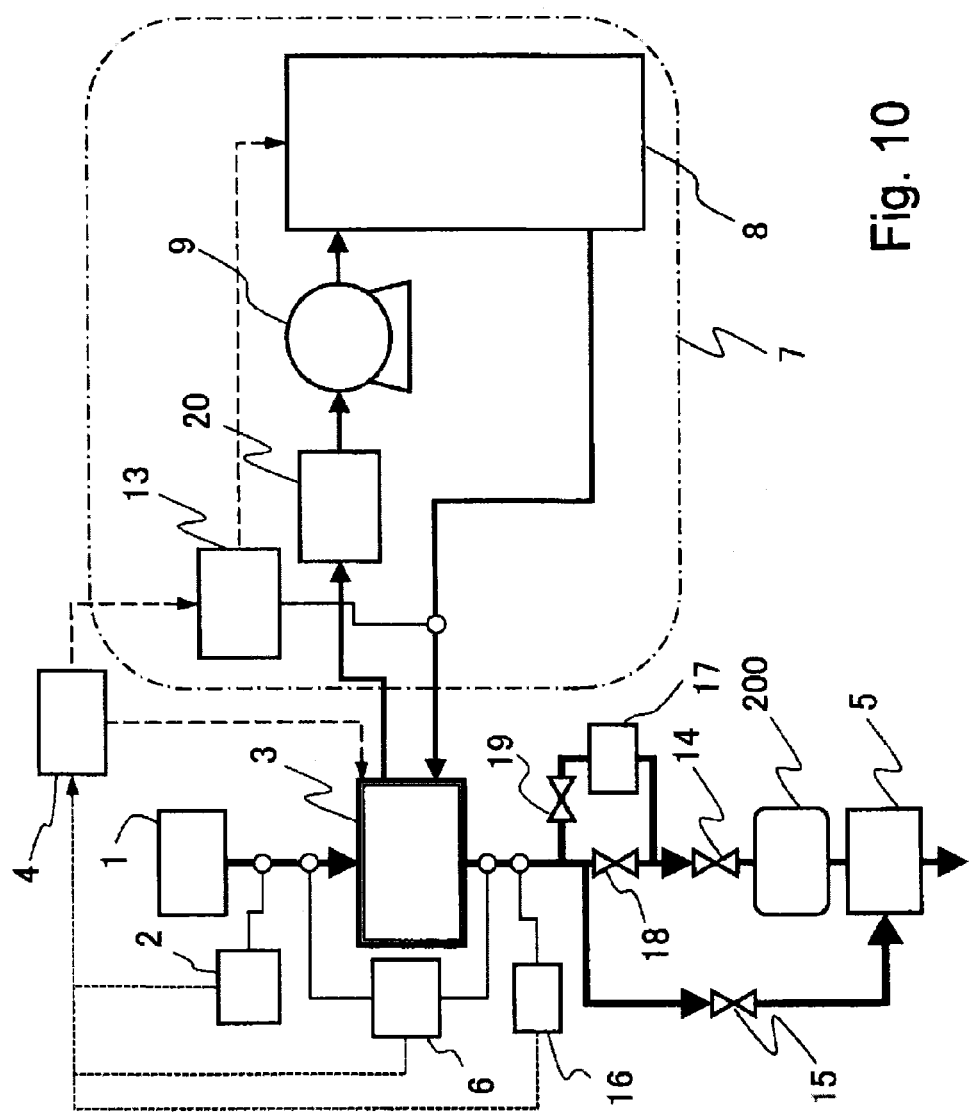
FIG. 10 is a systematic diagram showing a configuration of an ozone generating system according to Embodiment 6 of the invention.

FIG. 10 is a systematic diagram showing an instrumental configuration, a control system, a flow system and the like, of the ozone generating system according to Embodiment 6. In the figure, the same reference numerals are given for the parts similar to or corresponding to the configuration instruments of the ozone generating systems according to Embodiments 1 to 5, so that description thereof is omitted unless otherwise necessary. As shown in FIG. 10, in the ozone generating system according to Embodiment 6, there are provided a nitric-acid concentration measuring unit 16 and a nitric-acid trap 17 that are placed between the ozone generating device 3 and the ozone utilization facility 200, and a valve 18 and a valve 19 that control the gas flow to the nitric-acid trap.

Further, in the cooling system (temperature adjustment device 7), there is provided a heat exchanger 20 that is placed between the ozone generating device 3 and the circulation pump 9, and that executes heat exchange of the exhaust heat of the power source device for activating the ozone generating device 3 with the cooling water. In addition, the ozone generating device 3, the heat exchanger 20, the circulation pump 9 and the cooler 8 are connected by the pipings indicated by thick lines in the figure in a looped form, to thereby constitute a cooling line that circulates through between the ozone generating device 3, the heat exchanger 20, the circulation pump 9 and the cooler 8. Since the cooler 8 can turn ON/OFF its heat-exchanging function by command of the temperature adjuster 13, it is possible not only to adjust the water temperature of the cooling water output from the cooler 8 but also to increase the speed of the temperature rise of the water by use of heat provided from the heat exchanger 20.

Namely, as compared to Embodiment 5, there are provided the nitric-acid concentration measuring unit 16 that measures a concentration of nitric acid discharged from the ozone generating device 3 and the nitric-acid removing unit (nitric-acid trap 17) that traps nitric acid. Thus, in the normal operation, it is possible to utilize the nitric acid concentration as a requirement for switching to the maintenance mode, in addition to the gas dew point and the differential pressure. Besides, in the maintenance mode, it is possible to select whether to use the nitric-acid trap and which destination the ozonized gas is to be supplied, according to the measured nitric acid concentration. Thus, even when an ozonized gas whose composition is different to that in the normal operation mode, is not allowed to be used in the treatment process, it can be treated directly at the ozone removal treatment unit 5, so that it is not at all necessary to suspend the ozone generating device 3. Furthermore, since the heat exchanger 20 for recovering the exhaust heat from the power source of the ozone generating device 3 is provided in the cooling system (temperature adjustment device 7), it is possible to easily and quickly increase the temperature up to a preferred temperature or more. This causes $N_2O_5$ existing in the discharge space 305 to promptly make a phase change from a solid to a gas, so that the discharge product is suppressed from adhering in the discharge space 305 and to the electrode unit. Thus, with the maintenance mode, it is possible to execute the maintenance of the electrode unit without suspending the ozone generation and also without making the ozone generating device open to atmosphere.

Embodiment 7

An ozone generating system according to Embodiment 7 of the invention will be described. Although the ozone generating system according to Embodiment 7 is similar in basic configuration and operation to the ozone generating systems according to Embodiments 1 to 6, what is characteristic is that the source gas introduced into the ozone generating device is an oxygen gas.

Figure 11:
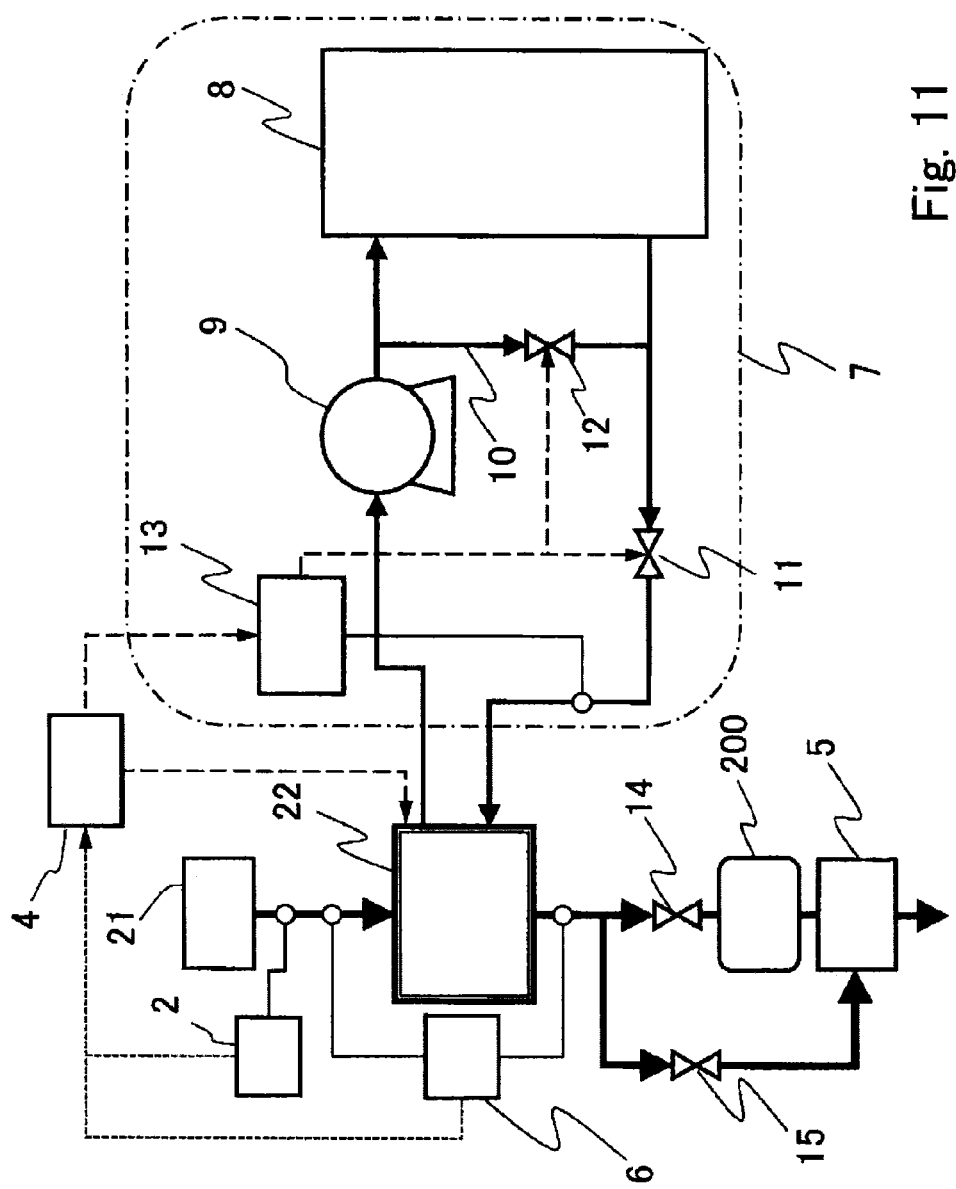
FIG. 11 is a systematic diagram showing a configuration of an ozone generating system according to Embodiment 7 of the invention.

FIG. 11 is a systematic diagram showing an instrumental configuration, a control system, a flow system and the like, of the ozone generating system according to Embodiment 7. In the figure, the same reference numerals are given for the parts similar to or corresponding to the configuration instruments of the ozone generating systems according to Embodiments 1 to 6, so that description thereof is omitted unless otherwise necessary. As shown in FIG. 11, the ozone generating system according to Embodiment 7 is different to those of Embodiments 1 to 6 in that a gas supplying device 21 for supplying the source gas to an ozone generating device 22, supplies an oxygen-rich mixed gas as aforementioned. Note that the configuration of a discharge electrode unit (corresponding to the discharge electrode unit 30 in Embodiments 1 to 6) will be described citing FIG. 2 having been used in Embodiment 1.

In Embodiments 1 to 6, the source gas of the ozone generating device 3 is air or a nitrogen-rich oxygen mixed gas. In this embodiment, as the source gas, an oxygen-rich mixed gas is used. An oxygen gas is fed from liquid oxygen or an oxygen gas cylinder. A mixed gas produced by adding to the oxygen gas a nitrogen gas of 0.1 to 2.0% relative to the amount of oxygen, or a mixed gas (oxygen purity is 90% or more) is fed from an oxygen producing device using VPSA (Vacuum Pressure Swing Adsorption) or PSA (Pressure Swing Adsorption), is used as the source gas. The ozone generating device 22 according to this embodiment is referred to as an oxygen-source ozone generating device.

When the source gas supplied to the ozone generating device 22 is come from liquid oxygen or an oxygen gas cylinder, it is necessary to add thereto a small amount of nitrogen gas, as aforementioned. When particularly high-purity oxygen is used, a phenomenon of significant reduction in the ozone generation efficiency is confirmed if nitrogen gas is not added at all. In order to avoid this phenomenon, the aforementioned amount of nitrogen is added. When the mount of nitrogen is less than 0.1%, an effect of improving the ozone generation efficiency is insufficient, and there is found an improvement by its addition of 0.1% or more. Meanwhile, when it exceeds 2.0%, because the production amount of NOx begins to increase, a reduction occurs in the ozone generation efficiency. Thus, in this embodiment, the addition amount of nitrogen is determined to be from 0.1 to 2.0%.

In this embodiment, as compared to the cases of air-source ozone generating devices (ozone generating device 3) shown in Embodiments 1 to 6, the nitrogen content is small in the source gas, and thus, the amount of NOx to be produced in the ozone generating device 22 is reduced. That is, a risk of the accumulation/adherence of the discharge product in the discharge unit is remarkably mitigated as compared to the case of the air source. Thus, the operational condition of the ozone generating device 22 is slightly different to the case of the air source.

When the oxygen-rich mixed gas is to be used, in the configuration of the discharge electrode unit in the ozone generating device 22, the gap length d of a discharge space (corresponding to the discharge space 305 in FIG. 2) is set to 0.2 mm or more but 0.6 mm or less, preferably to 0.2 mm or more but 0.4 mm or less. In the case of using the oxygen-rich mixed gas, even if the gap length d becomes shorter than the lower limit of 0.3 mm shown in Embodiments 1 to 6, namely, an intensity of the electric field becomes higher, the production amount of NOx is much less than in Embodiments 1 to 6, so that there is less effect on the ozone generation efficiency. Rather, the enhancement in electric field in the oxygen-source ozone generating device (ozone generating device 22) suppresses a decomposing effect of the generated ozone, and thus the ozone generation efficiency is enhanced.

Meanwhile, in the case where the gap length d is less than 0.2 mm, although a more highly-efficient ozone generation is expected, it becomes difficult to form the gap length uniformly over all region of the discharge space, and thus this is unfavorable in fabrication. The applied power density to be applied to the ozone generating device 22 is from 0.05 $W/cm^2$ to 0.6 $W/cm^2$, preferably, from 0.3 $W/cm^2$ to 0.6 $W/cm^2$. This is because cooling of the discharge space is promoted as the lower limit of the gap length d becomes lower, so that the applicable power can be enlarged as compared to the cases of Embodiments 1 to 6. The gas pressure P is, similarly to Embodiments 1 to 6, set to 0.2 MPaG or less, preferably to 0.1 MPaG or more but less than 0.2 MPaG.

When the oxygen-source ozone generating device (ozone generating device 22) is applied to Embodiments 1 to 6, an amount of instantaneously produced $N_2O_5$ will be much less than by the air-source ozone generating device. However, it is similar to Embodiments 1 to 6 in that, by the operation for a long time and by the amount of water associated with the source gas, the accumulation of the discharge product and the production of nitric acid occur in the ozone generating device 22. Thus, even in the oxygen-source ozone generating device, it is effective to apply the maintenance mode shown in Embodiments 1 to 6.

The control unit 4, when detected a sign of abnormality in the discharge electrode unit, that is, when the normal operation mode is switched to the maintenance mode, manipulates at least one of the density of power applied to the ozone generating device 22 and the temperature of the cooling water supplied to the ozone generating device 22, to thereby increase the electrode tube temperature so that the electrode tube temperature is maintained in an area C of the oxygen-source ozone generating device that is equivalent to the area C shown in FIG. 4, and the saturated vapor pressure of $N_2O_5$ corresponding to the electrode tube temperature becomes higher than the gas pressure in the discharge space. Alternatively, it reduces the gas pressure so that the saturated vapor pressure of $N_2O_5$ corresponding to the electrode tube temperature becomes higher than the gas pressure in the discharge space.

As a result of the above, the temperatures of the electrode tube and the discharge space become a value enough to change the state of the discharge product, so that it becomes possible to physically remove the discharge product in the discharge space, and also to reduce significantly the staying probability and the staying time of nitric acid in the ozone generating device 22. Thus, it is unnecessary to suspend the ozone generating system and to make the ozone generating device 22 open to atmosphere, so that the number of the open inspections can be reduced significantly in comparison with the conventional cases. Further, it is also unnecessary to newly add an instrument for maintenance, so that, it is possible even for the user side to easily clean up the discharge unit without making the ozone generating device 22 open. Furthermore, the discharge space is prevented beforehand from being choked off, and the metal members and the high-voltage electrode are suppressed from being corroded, so that it is possible to continue highly-efficient ozone generation in a highly reliable manner.

For the conventional open-to-atmosphere maintenance, a lot of time is required, so that the suspended time of the system and the cost for the maintenance have placed a burden on the user. According to this embodiment, as aforementioned, the number of the open inspections can be reduced significantly, and in particular, since the discharge unit can be cleaned up without making it open to atmosphere, a great effect is provided in that a step for restoring the dew point of the gas in the ozone generating device after the conventional open-to-atmosphere maintenance, becomes unnecessary, to thereby cut out a lot of time required for that step. Further, a consumed amount of the source gas not served for the generation of ozone, but taken for restoring the gas dew point, can also be reduced.

As described above, according to the ozone generating system according to Embodiment 7, in the case with the oxygen-source ozone generating device (ozone generating device 22), it is possible to execute an efficient operation by setting the gap length d of the discharge space (corresponding to the discharge space 305 in FIG. 2) to 0.2 mm or more but 0.6 mm or less, preferably to 0.2 mm or more but 0.4 mm or less.

Embodiment 8

An ozone generating system according to Embodiment 8 of the invention will be described. The ozone generating system according to Embodiment 8 is similar in basic configuration and operation to the ozone generating systems according to Embodiments 1 to 7.

Figure 12:
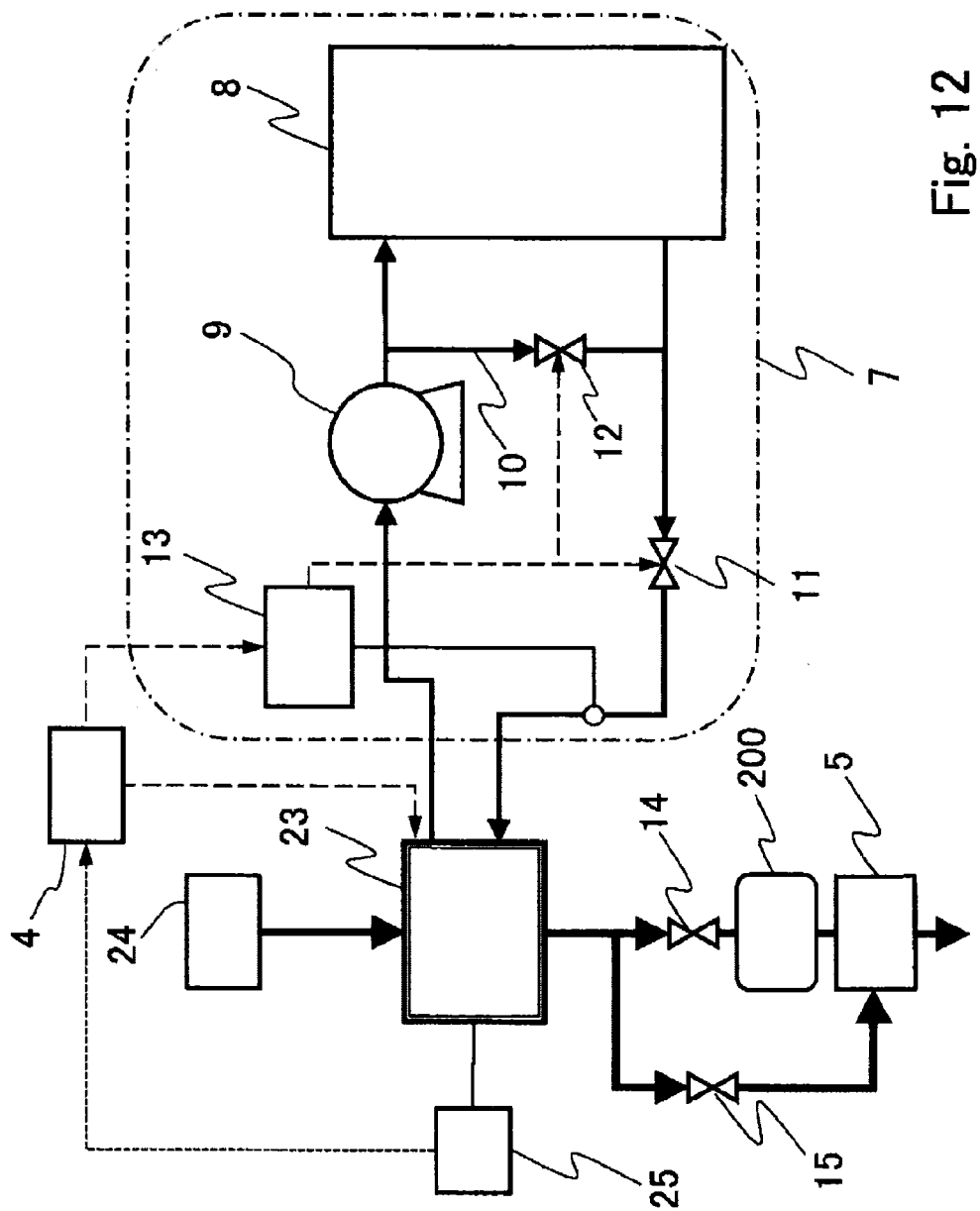
FIG. 12 is a systematic diagram showing a configuration of an ozone generating system according to Embodiment 8 of the invention.

FIG. 12 is a systematic diagram showing an instrumental configuration, a control system, a flow system and the like, of the ozone generating system according to Embodiment 8. In the figure, the same reference numerals are given for the parts similar to or corresponding to the components of the ozone generating systems according to Embodiments 1 to 7, so that description thereof is omitted unless otherwise necessary. In FIG. 12, in the ozone generating system according to Embodiment 8, a gas supplying device 24 for supplying a source gas to an ozone generating device 23 may be either of an oxygen source and an air source that are mentioned above. The operational condition, such as a gap length d of the oxygen-source or air-source ozone generating device, is similar to that described in Embodiments 1 to 7. Note that the configuration of a discharge electrode unit (corresponding to the discharge electrode unit 30 in Embodiments 1 to 6) will be described citing FIG. 2 having been used in Embodiment 1, and the switching operation from the normal operation mode to the maintenance mode will be described citing FIG. 3.

In this embodiment, what is characterized is in that, the operation mode is switched in a state where the discharge for generating ozone is continued without change in the ozone generating device 23, when a sign of abnormality in the discharge electrode unit is detected by the control unit 4 on the basis of a value of a detection unit 25 that detects, as an ozone generation parameter, at least one or more of:

the gas dew point, the differential pressure of the ozone generating device, the inlet-side gas pressure and outlet-side gas pressure of the ozone generating device, that are shown in Embodiments 1 to 7, the nitric acid concentration and the NOx concentration that are shown in Embodiment 2; and in addition to these, an accumulated amount of water supplied in associated manner to the ozone generating device 23, a flow rate of the source gas supplied to the ozone generating device 23, a concentration of ozone output from the ozone generating device 23, a flow rate of the ozone gas, a generation amount of ozone, an ozone generation efficiency, and further, an operating time.

Note that in FIG. 12, for convenience sake, the detection unit 25 is connected to the ozone generating device 23 as a representative; however, the detection points of respective detection means thereof are each placed in a proper position depending on each physical amount.

The detection unit 25 will be described. For the gas dew point, the differential pressure of the ozone generating device, the inlet-side gas pressure, the outlet-side gas pressure, the nitric acid concentration and the NOx concentration, the same is applied as described in Embodiments 1 to 7. The accumulated amount of water supplied in associated manner to the ozone generating device 23 is a temporally integrated value of the water amount converted from the gas dew point, and represents a total amount of water supplied in associated manner to the ozone generating device 23 in a given constant period. This makes it possible to find the necessity of switching to the maintenance mode, more exactly than the gas dew point that is for detecting an instantaneous amount of water. Further, the concentration of ozone, the generation amount of ozone and the ozone generation efficiency of the ozone generating device 23 are values each directly representing a capacity of the ozone generating device 23, so that it is possible to detect the necessity of switching to the maintenance mode by way of a sign of deterioration in the capacity of the device. The flow rate of the source gas and the flow rate of the ozone gas can be used as substitutes for the gas pressure and the differential pressure. Further, the operating time can be freely set by the user, and is used for switching to the maintenance mode at a scheduled timing, such as, before the termination, at the starting, and at a low load, etc., of the system, or at a predetermined timing, such as, at the electrode-unit cleaning work timing that is determined by the user, for example, once a year.

The control unit 4, when detected a sign of abnormality in the discharge electrode unit, that is, when the normal operation mode is switched to the maintenance mode, manipulates at least one of the density of power applied to the ozone generating device 23 and the temperature of the cooling water supplied to the ozone generating device 23, to thereby increase the electrode tube temperature so that the electrode tube temperature is maintained in an area C in this embodiment that is equivalent to the area C shown in FIG. 4, and the saturated vapor pressure of $N_2O_5$ corresponding to the electrode tube temperature becomes higher than the gas pressure in the discharge space. Alternatively, it reduces the gas pressure so that the saturated vapor pressure of $N_2O_5$ corresponding to the electrode tube temperature becomes higher than the gas pressure in the discharge space.

Figure 13:
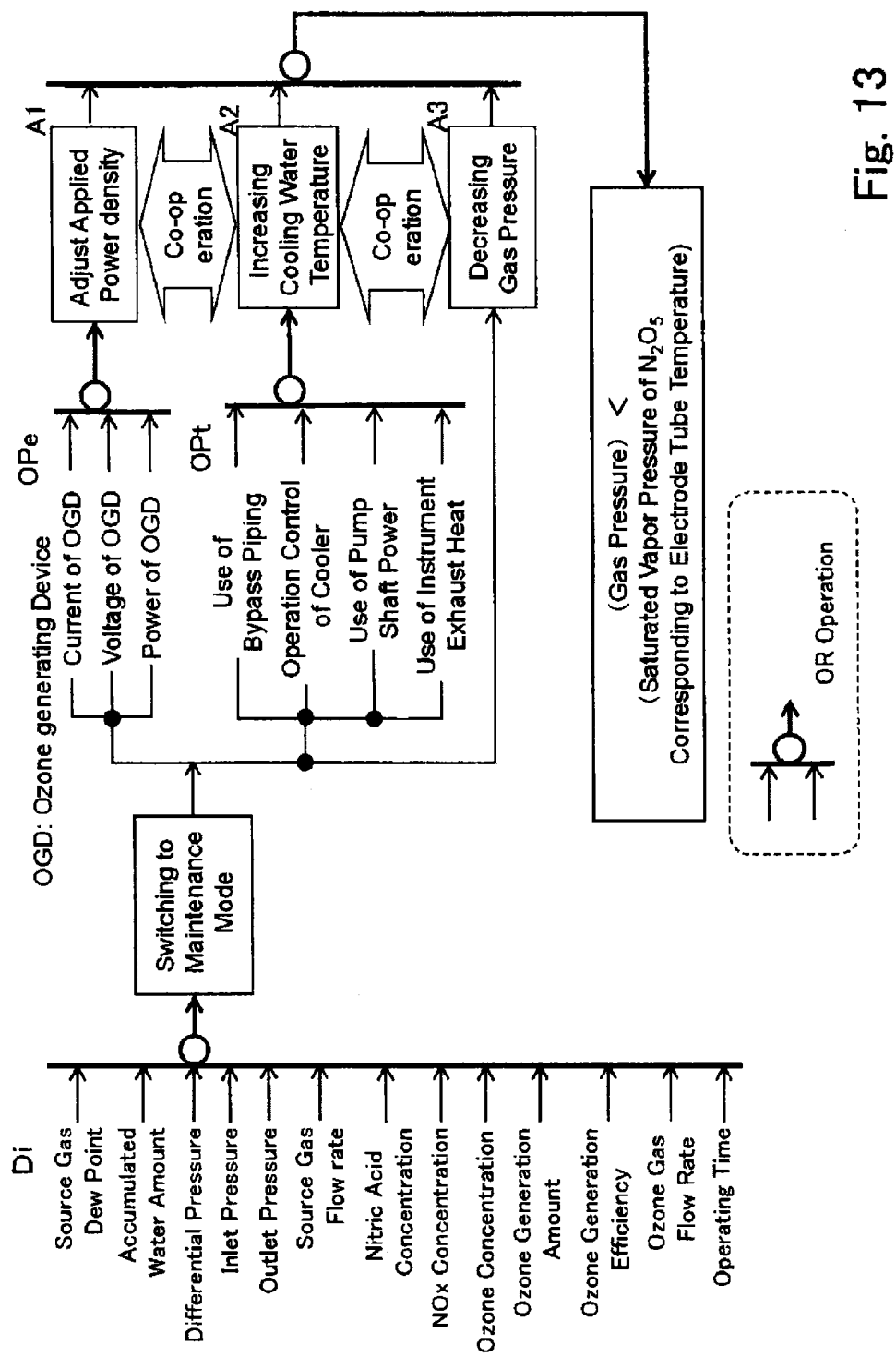
FIG. 13 is a flowchart for illustrating a method of operating the ozone generating system according to Embodiment 8 of the invention.

An operation in the maintenance mode will be described. A maintenance mode-related control flow is shown in FIG. 13. In the figure, each circle "∘" with arrow indicated at the right side of each vertical bar that is a destination of a plurality of arrows, means that the flow goes toward the arrow at the right side of "∘" when any of these shown at the origin side of the plurality of arrows is fulfilled, namely, it means an OR operation as shown in the enclosed section. In the figure, when the switching to the maintenance mode is made based on a signal (Di) of the detection unit 25 as an ozone generation parameter, the power density (A1) applied to the ozone generating device 23 that is to be adjusted by way of the control unit 4, is adjusted by manipulating at least one of the voltage, the current and the power (OPe) applied to the ozone generating device 23. Note that, although not shown in the figure, because the power density (A1) changes also by adjusting the gas pressure P (A3), the gas pressure P can be thought to be an operational element (OPe) for the power density (A1).

Meanwhile, the temperature (A2) of the cooling water supplied to the ozone generating device 23 is adjusted by use of the bypass piping 10. Further, although not shown in the figure, it is effective to use the operational control of the cooler 8, the shaft power of the circulation pump 9 and the exhaust heat of the power source device, that are shown in Embodiments 2 to 6, so that the adjustment can be made by manipulating at least one of these (OPt).

That is, in the ozone generating system according to this embodiment, it is possible to concurrently control the applied power density (A1), the cooling water temperature (A2) and the gas pressure P (A3) of the ozone generating device 23 on the basis of at least one of the detection values (Di: ozone generation parameters) output from a plurality of detection units, to thereby promote a phase change of $N_2O_5$ from a solid to a gas. For example, at the same time of switching to the maintenance mode, the cooling water temperature is adjusted by use of the bypass piping 10 to thereby increase the electrode tube temperature. Thereafter, the applied power density is increased by adjusting the current of the ozone generating device 23 to thereby finely adjust the electrode tube temperature. Alternatively, at the same time of switching to the maintenance mode, the gas pressure of the ozone generating device 23 is reduced.

As a result, the impedance in the ozone generating device 23 is reduced, and thus it becomes more likely to cause an electric discharge therein, so that the applied power density can be enlarged without largely adjusting the applied voltage to the ozone generating device 23. Thereafter, the electrode tube temperature may be finely adjusted by adjusting the cooling water temperature. Of course, these manipulations are not limitative here. By these manipulations, a phase change of $N_2O_5$ from a solid to a gas can be achieved highly accurately in a state of continuing generation of ozone. Thus, the staying probability and the staying time of the discharge product in the discharge space are reduced drastically, so that the accumulation/adherence of the discharge product in the discharge space can be suppressed.

By the maintenance mode shown in this embodiment, the temperatures of the electrode tube and the discharge space become a value enough to change the state of the discharge product, so that it becomes possible to physically remove the discharge product in the discharge space, and also to reduce significantly the staying probability and the staying time of nitric acid in the ozone generating device 23. Thus, it is unnecessary to suspend the ozone generating system and to make the ozone generating device 23 open to atmosphere, so that the number of the open inspections can be reduced significantly in comparison with the conventional cases. Further, it is also unnecessary to newly add an instrument for maintenance, so that it is possible even for the user side to easily clean up the discharge unit without making the ozone generating device 23 open. Furthermore, the discharge space is prevented beforehand from being choked off, and the metal members and the high-voltage electrode are suppressed from being corroded, so that it is possible to continue highly-efficient ozone generation in a highly reliable manner.

For the conventional open-to-atmosphere maintenance, a lot of time is required, so that the suspended time of the system and the cost for the maintenance have placed a burden on the user. According to this embodiment, as aforementioned, the number of the open inspections can be reduced significantly, and in particular, since the discharge unit can be cleaned up without making it open to atmosphere, a great effect is provided in that a step for restoring the dew point of the gas in the ozone generating device after the conventional open-to-atmosphere maintenance, becomes unnecessary, to thereby cut out a lot of time required for that step. Further, a consumed amount of the source gas not served for the generation of ozone, but taken for restoring the gas dew point, can also be reduced.

Further, based on the aforementioned ozone generation parameter (detection value Di), at the time of switching to the maintenance mode, by executing a cooperative control of the cooling water temperature (A2) and the gas pressure (A3) using the temperature adjustment device (exactly, the temperature adjuster 13) and the gas supplying device (1,21,24) or by executing a cooperative control of the cooling water temperature (A2) and the applied power (A1) using the temperature adjustment device and the power source device, it is possible to achieve a highly-accurate and stable maintenance mode.

In particular, by controlling cooperatively the cooling water temperature (A2), the gas pressure (A3) and the applied power (A1) using the temperature adjustment device, the gas supplying device and the power source device, it is possible to achieve a more highly-accurate and stable maintenance mode.

As described above, the ozone generating system according to Embodiment 8 is configured to include: the ozone generating device (3,22,23) having the discharge electrodes (discharge electrode unit 30) that are arranged opposite to each other to thereby form the discharge space 305; the gas supplying device (1,21,24) that supplies an oxygen-containing gas as a source gas for generating ozone to the discharge space 305; the unshown power source device that supplies power for discharging to the discharge electrodes (discharge electrode unit 30); the temperature adjustment device 7 that adjusts the temperature of the discharge electrodes (discharge electrode unit 30); the control unit 4 that controls the gas supplying device (1,21,24), the power source device and the temperature adjustment device 7 to thereby control the operation of the ozone generating device (3,22,23); and the detection unit 25 that detects an ozone generation parameter (detection value Di) in the ozone generating device (3,22,23); wherein the control unit 4 causes the temperature of the discharge electrodes (discharge electrode unit 30) to increase up to the vaporizing temperature of dinitrogen pentoxide by controlling the temperature adjustment device 7 (exactly, the temperature adjuster 13) and the gas supplying device (1,21, 24) or the temperature adjustment device 7 (exactly, the temperature adjuster 13) and the power source device in their cooperative manner, on the basis of the value of the ozone generation parameter (detection value Di) output from the detection unit 25, to thereby control the operation of the ozone generating device (3,22,23) to be switched from the normal operation mode to a cleaning operation mode (the maintenance mode) in which surfaces of the discharge electrodes (discharge electrode unit 30) and the discharge space 305 are cleaned up in a state of continuing generation of ozone in the discharge space 305. Thus, it is possible to achieve a highly-reliable ozone generating system which can maintain a stable operating state.

Further, as described above, the ozone generation method according to Embodiment 8 is an ozone generation method in which an oxygen-containing gas is supplied to the ozone generating device (3,22,23) having discharge electrodes (discharge electrode unit 30) that are arranged opposite to each other to form the discharge space 305, to thereby generate ozone using an electric discharge in the discharge space 305, wherein an ozone generation parameter (detection value Di) in the ozone generating device (3,22,23) is detected, and then, by controlling the temperature of cooling water (A2) for cooling the discharge electrodes (discharge electrode unit 30) and the gas pressure P (A3), or the temperature of the cooling water (A2) for cooling the discharge electrodes (discharge electrode unit 30) and the applied power (A1) to the discharge electrodes (discharge electrode unit 30) in their cooperative manner, and based on the value of the ozone generation parameter (detection value Di), the temperature of the discharge electrodes (discharge electrode unit 30) is increased up to the vaporizing temperature of dinitrogen pentoxide, to thereby clean up surfaces of the discharge electrodes (discharge electrode unit 30) and the discharge space 305 in a state of continuing generation of ozone in the discharge space 305. Thus, it is possible to achieve a highly-reliable ozone generating system which can maintain a stable operating state.

DESCRIPTION OF REFERENCE NUMERALS AND SIGNS

1,21,24: gas supplying device, 2: dew-point measuring unit (detection unit), 3,22,23: ozone generating device, 30: discharge electrode unit (discharge electrodes), 301: grounding electrode tube, 304: high-voltage electrode tube, 305: discharge space, 4: control unit, 5: ozone removal treatment unit, 6: differential-pressure measuring unit (detection unit), 7: cooling system (temperature adjustment device), 8: cooler, 9: circulation pump, 10: bypass piping, 13: temperature adjuster, 20: heat exchanger, 16: nitric-acid concentration measuring unit (detection unit), 17: nitric-acid trap (nitric acid removing unit), 25: detection unit, 200: ozone utilization facility, A1: applied power, A2: cooling water temperature, Di: detection value (ozone generation parameter), d: space length (interval between electrodes), P: gas pressure (A3).

The invention claimed is:

1. An ozone generating system, comprising:
an ozone generating device including discharge electrodes that are arranged opposite to each other to thereby form a discharge space;
a gas supplying device that supplies an oxygen-containing gas as a source gas for generating ozone to the discharge space;
a power source device that supplies power for discharging to the discharge electrodes;
a temperature adjustment device that adjusts a temperature of the discharge electrodes;
a controller that controls the gas supplying device, the power source device and the temperature adjustment device, to thereby control an operation of the ozone generating device; and
a detector that detects an ozone generation parameter in the ozone generating device;
wherein, the controller is configured to
increase the temperature of the discharge electrodes up to a vaporizing temperature of dinitrogen pentoxide by controlling the temperature adjustment device and the gas supplying device or the temperature adjustment device and the power source device in a cooperative manner, based on an ozone generation parameter output from the detector, and
switch the operation of the ozone generating device from a normal operation mode to a cleaning operation mode in which surfaces of the discharge electrodes and the discharge space are cleaned up in a state where the ozone generating device continues to generate ozone in the discharge space.

2. The ozone generating system of claim 1, wherein the ozone generation parameter is at least one selected from the group consisting of: a dew point of the source gas supplied to the discharge space, an accumulated amount of water associated with the source gas, a differential pressure produced in the ozone generating device, an inlet gas pressure of the ozone generating device, an outlet gas pressure of the ozone generating device, a flow rate of the source gas, an ozone concentration in an ozone gas output from the ozone generating device, a flow rate of the ozone gas, a generation amount of the ozone gas, an ozone generation efficiency, a nitric acid concentration in the ozone gas, a NOx concentration in the ozone gas, and an operating time.

3. The ozone generating system of claim 2, wherein the controller is further configured to control a density of applied power that is applied to the discharge space, a temperature of cooling water flowing through the discharge electrodes and a gas pressure in the discharge space, to thereby cause the temperature of the discharge electrodes to increase.

4. The ozone generating system of claim 3, wherein the controller is further configured to decrease a gas pressure in the discharge space to a predetermined pressure that exceeds atmospheric pressure so that a saturated vapor pressure of dinitrogen pentoxide corresponding to the temperature of the discharge electrodes becomes higher than the gas pressure in the discharge space.

5. The ozone generating system, of claim 2, wherein the controller is further configured to decrease a gas pressure in the discharge space to a predetermined pressure that exceeds atmospheric pressure so that a saturated vapor pressure of dinitrogen pentoxide corresponding to the temperature of the discharge electrodes becomes higher than the gas pressure in the discharge space.

6. The ozone generating system of claim 2, wherein a gas pressure in the discharge space is set to 0.1 MPa or more but less than 0.2 MPa, as a gauge pressure.

7. The ozone generating system of claim 2, wherein the detector includes a nitric acid-concentration measuring circuit configured to measure a nitric acid concentration in an ozonized gas supplied from the ozone generating device or a NOx-concentration measuring circuit that measures a NOx concentration therein, and a nitric acid removing device that removes a nitric-acid component in the ozonized gas is provided downstream of the ozone generating device; and
    wherein the controller is configured to
        switch the operation mode of the ozone generating device to the cleaning operation mode, when a value of the nitric acid concentration or the NOx concentration is higher than a first specified value, and
        pass at least a part of the ozonized gas through the nitric acid removing device when a value of the nitric acid concentration or the NOx concentration is higher than a second specified value that is higher than the first specified value.

8. The ozone generating system of claim 2, wherein an interval between the discharge electrodes arranged opposite to each other is 0.2 mm or more and 0.6 mm or less.

9. The ozone generating system of claim 2, wherein the temperature adjustment device includes a main piping configured so that cooling water going out from the discharge electrodes passes through a cooler and is then returned to the discharge electrodes, and a bypass piping configured so that the cooling water going out from the discharge electrodes is returned to the discharge electrodes without passing through the cooler, and
    wherein an endothermic amount of the cooler from the cooling water is reduced by increasing a ratio of the cooling water to be flowed through the bypass piping.

10. The ozone generating system of claim 2, wherein the temperature adjustment device includes a heat exchanger that heats cooling water going out from the discharge electrodes by exhaust heat coming from the power source device.

11. The ozone generating system of claim 1, wherein the controller is further configured to control a density of applied power that is applied to the discharge space, a temperature of cooling water flowing through the discharge electrodes and a gas pressure in the discharge space, to thereby cause the temperature of the discharge electrodes to increase.

12. The ozone generating system of claim 11, wherein the controller is further configured to decrease a gas pressure in the discharge space to a predetermined pressure that exceeds atmospheric pressure so that a saturated vapor pressure of dinitrogen pentoxide corresponding to the temperature of the discharge electrodes becomes higher than the gas pressure in the discharge space.

13. The ozone generating system of claim 1, wherein the controller is further configured to decrease a gas pressure in the discharge space to a predetermined pressure that exceeds atmospheric pressure so that a saturated vapor pressure of dinitrogen pentoxide corresponding to the temperature of the discharge electrodes becomes higher than the gas pressure in the discharge space.

14. The ozone generating system of claim 1, wherein a gas pressure in the discharge space is set to 0.1 MPa or more but less than 0.2 MPa, as a gauge pressure.

15. The ozone generating system of claim 1, wherein the detector includes a nitric acid-concentration measuring circuit configured to measure a nitric acid concentration in an ozonized gas supplied from the ozone generating device or a NOx-concentration measuring circuit that measures a NOx concentration therein, and a nitric acid removing device that removes a nitric-acid component in the ozonized gas is provided downstream of the ozone generating device; and
    wherein the controller is configured to
        switch the operation mode of the ozone generating device to the cleaning operation mode, when a value of the nitric acid concentration or the NOx concentration is higher than a first specified value, and
        pass at least a part of the ozonized gas through the nitric acid removing device when a value of the nitric acid concentration or the NOx concentration is higher than a second specified value that is higher than the first specified value.

16. The ozone generating system of claim 1, wherein an interval between the discharge electrodes arranged opposite to each other is 0.2 mm or more and 0.6 mm or less.

17. The ozone generating system of claim 1, wherein the temperature adjustment device includes a main piping configured so that cooling water going out from the discharge electrodes passes through a cooler and is then returned to the discharge electrodes, and a bypass piping configured so that the cooling water going out from the discharge electrodes is returned to the discharge electrodes without passing through the cooler, and
    wherein an endothermic amount of the cooler from the cooling water is reduced by increasing a ratio of the cooling water to be flowed through the bypass piping.

18. The ozone generating system of claim 1, wherein the temperature adjustment device includes a heat exchanger that heats cooling water going out from the discharge electrodes by exhaust heat coming from the power source device.

19. The ozone generating system of claim 1, further comprising:
    a differential-pressure measuring device configured to measure a differential pressure produced by the ozone generating device; and
    a dew-point, measuring device configured to measure a dew point of an oxygen-containing gas supplied as a source gas for generating ozone to the ozone generating device,
    wherein the controller is configured to switch to the cleaning operation mode based on the differential pressure measured by the differential-pressure measuring device and the dew-point measured by the dew-point measuring device.

20. The ozone generating system of claim 1, further comprising:
    a temperature adjuster configured to adjust a water temperature of cooling water for cooling the ozone generating device,
    wherein the temperature adjuster is configured to adjust the water temperature in the cleaning operation mode to be higher than the water temperature in the normal operation mode, and
    wherein the controller is configured to adjust an applied power density applied to the ozone generating device in the cleaning operation mode to be higher than the applied power density applied to the ozone generating device in the normal operating mode.

21. An ozone generation method comprising:

supplying an oxygen-containing gas to an ozone generating device, the ozone generating device including discharge electrodes that are arranged opposite to each other to form a discharge space;

generating ozone using an electric discharge in the discharge space;

detecting an ozone generation parameter in the ozone generating device; and increasing a temperature of the discharge electrodes up to a vaporizing temperature of dinitrogen pentoxide by controlling a temperature of cooling water for cooling the discharge electrodes and a pressure of the gas, or controlling the temperature of the cooling water for cooling the discharge electrodes and an applied power to the discharge electrodes in their cooperative manner, based on a value of an ozone generation parameter, to thereby clean up surfaces of the discharge electrodes, wherein the ozone generating device remains in a state of continuing generation of ozone in the discharge space.

* * * * *